(12) United States Patent
Tabata et al.

(10) Patent No.: US 8,072,863 B2
(45) Date of Patent: Dec. 6, 2011

(54) OPTICAL RECORDING METHOD, OPTICAL RECORDING APPARATUS AND OPTICAL STORAGE MEDIUM

(75) Inventors: Hiroshi Tabata, Mito (JP); Kenji Tokui, Hitachinaka (JP); Ikuo Matsumoto, Mito (JP); Shinji Higuchi, Mito (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 1263 days.

(21) Appl. No.: 11/320,415

(22) Filed: Dec. 28, 2005

(65) Prior Publication Data
US 2006/0140096 A1   Jun. 29, 2006

(30) Foreign Application Priority Data

Dec. 28, 2004 (JP) .................................. 2004-379542
Sep. 14, 2005 (JP) .................................. 2005-266508

(51) Int. Cl.
*G11B 7/00* (2006.01)
(52) U.S. Cl. ............... 369/59.11; 369/47.51; 369/94; 369/53.26; 369/116
(58) Field of Classification Search ............. 369/59.11, 369/13.01, 47.1, 94, 47.51, 53.26, 99, 101, 369/126, 116, 44.11, 124.01, 44.29
See application file for complete search history.

(56) References Cited

U.S. PATENT DOCUMENTS

| 7,142,496 | B2 * | 11/2006 | Miyagawa et al. | ...... | 369/59.11 |
| 2005/0002309 | A1 * | 1/2005 | Ogihara | ........ | 369/100 |

FOREIGN PATENT DOCUMENTS

| JP | 02-278518 | 11/1990 |
| JP | 05-151572 | 6/1993 |
| JP | 06-012674 | 1/1994 |
| JP | 09-007176 | 1/1997 |
| JP | 11-273075 | 10/1999 |
| JP | 2003-006923 | 1/2003 |
| JP | 2003-022572 | 1/2003 |
| JP | 2003-045085 | 2/2003 |
| JP | 2003-178448 | 6/2003 |
| JP | 2003-242687 | 8/2003 |
| JP | 2003-257033 | 9/2003 |
| JP | 2004-063005 | 2/2004 |
| JP | 2005-510824 | 4/2005 |
| JP | 2005-149545 | 6/2005 |
| WO | WO 2005/004134 | 1/2005 |

\* cited by examiner

*Primary Examiner* — Thang Tran
*Assistant Examiner* — Dionne Pendleton
(74) *Attorney, Agent, or Firm* — Renner, Kenner, Greive, Bobak, Taylor & Weber

(57) ABSTRACT

Data is recorded in a phase-change optical storage medium having data layers. A first recording pulse sequence is generated for recording to a first data layer located most remote from a beam-incident surface. The first sequence has a recording pulse carrying an erasing power and a recording power rising from the erasing power, and a cooling pulse carrying a bottom power lower than the erasing power. A second recording pulse sequence is generated for recording to a second data layer. The second sequence has recording pulse carrying an erasing power and a recording power rising from the erasing power, a cooling puse carrying a bottom power lower than the erasing power, and an erasing top pulse carrying an erasing top power higher than the erasing power.

3 Claims, 19 Drawing Sheets

| FILM | REFLECTIVITY | ABSORPTION COEFFICIENT | SPECIFIC HEAT [J/cm3·°C] | THERMAL CONDUCTIVITY [J/cm·sec·°C] |
|---|---|---|---|---|
| REFLECTIVE FILM 105 | 0.07 | 4.20 | 2.478 | 4.290 |
| DIELECTRIC FILM 104 | 2.15 | 0.00 | 2.054 | 0.001 |
| RECORDING FILM 103 | 3.36 | 4.38 | 1.379 | 0.243 |
| DIELECTRIC FILM 102 | 2.15 | 0.00 | 2.054 | 0.001 |
| POLYCARBONATE SUBSTRATE 101 | 1.58 | 0.00 | 1.507 | 0.002 |

FIG. 9

| | TRANSMISSIVITY Tr=30% | | TRANSMISSIVITY Tr=50% | | TRANSMISSIVITY Tr=70% | |
|---|---|---|---|---|---|---|
| | PULSE SEQUENCE1 | PULSE SEQUENCE2 | PULSE SEQUENCE1 | PULSE SEQUENCE2 | PULSE SEQUENCE1 | PULSE SEQUENCE2 |
| | FILM THICKNESS [nm] | | | | | |
| REFLECTIVE FILM 105 | 8.5 | | 5 | | 2 | |
| DIELECTRIC FILM 104 | 9 | | 9 | | 9 | |
| RECORDING FILM 103 | 7 | | 5 | | 2 | |
| DIELECTRIC FILM 102 | 66 | | 66 | | 66 | |
| | LASER POWER [mW] | | | | | |
| Pw | 20.0 | 20.0 | 23.1 | 23.1 | 32.0 | 32.0 |
| Pe | 4.6 | 4.6 | 5.1 | 5.1 | 6.5 | 6.5 |
| Pb | 0.5 | 0.5 | 0.5 | 0.5 | 0.5 | 0.5 |
| Pet | - | 20.0 | - | 23.1 | - | 32.0 |
| | STRATEGY [T] | | | | | |
| Ttop | 0.17 | 0.17 | 0.17 | 0.17 | 0.17 | 0.17 |
| Tmp | 0.21 | 0.21 | 0.21 | 0.21 | 0.21 | 0.21 |
| Tcl | 0.53 | 0.53 | 0.53 | 0.53 | 0.53 | 0.53 |
| Tet | - | 0.10 | - | 0.18 | - | 0.18 |

FIG. 10

| | ERASING TOP PULSE Tet | DOW JITTER [%] | | | | | |
|---|---|---|---|---|---|---|---|
| | | DOW0 | DOW1 | DOW9 | DOW19 | DOW99 | DOW999 |
| EMBODIMENT SAMPLE 1 | USED | 7.2 | 9.2 | 8.5 | 8.6 | 8.9 | 9.2 |
| COMPARATIVE SAMPLE 1 | NOT USED | 11.3 | 15.4 | 13.0 | 14.0 | 19.8 | 25.0 |

|  | ERASING TOP PULSE Tet | DOW JITTER [%] | | | | | |
| --- | --- | --- | --- | --- | --- | --- | --- |
|  |  | DOW0 | DOW1 | DOW9 | DOW19 | DOW99 | DOW999 |
| EMBODIMENT SAMPLE 1 | NOT USED | 6.8 | 8.1 | 7.6 | 7.8 | 8.2 | 9.1 |
| COMPARATIVE SAMPLE 1 | USED | 7.8 | 9.2 | 8.3 | 8.5 | 8.8 | 10.3 |

| | Pet | Pw | Pet/Pw | DOW0 | DOW1 | DOW9 | DOW999 |
|---|---|---|---|---|---|---|---|
| EMBODIMENT SAMPLE 2 | 23.1 | 23.1 | 1.0 | 7.2 | 9.2 | 8.5 | 9.2 |
| EMBODIMENT SAMPLE 3 | 34.7 | 23.1 | 1.5 | 7.8 | 9.8 | 9.1 | 9.8 |
| EMBODIMENT SAMPLE 4 | 41.6 | 23.1 | 1.8 | 8.3 | 11.1 | 10.9 | 11.6 |
| EMBODIMENT SAMPLE 5 | 16.2 | 23.1 | 0.7 | 7.7 | 9.6 | 9.4 | 9.9 |
| EMBODIMENT SAMPLE 6 | 9.2 | 23.1 | 0.4 | 8.4 | 11.0 | 11.2 | 11.9 |
| COMPARATIVE SAMPLE 2 | 46.2 | 23.1 | 2.0 | 8.6 | 12.4 | 12.8 | 13.5 |
| COMPARATIVE SAMPLE 3 | 6.9 | 23.1 | 0.3 | 8.4 | 13.9 | 13.4 | 14.3 |

FIG. 16

| | Pet | Pw | Pet/Pw | DOW0 | DOW1 | DOW9 | DOW999 |
|---|---|---|---|---|---|---|---|
| EMBODIMENT SAMPLE 7 | 16.0 | 20.0 | 0.8 | 6.5 | 7.3 | 7.2 | 7.9 |
| EMBODIMENT SAMPLE 8 | 24.0 | 20.0 | 1.2 | 6.9 | 7.8 | 7.6 | 9.9 |
| EMBODIMENT SAMPLE 9 | 30.0 | 20.0 | 1.5 | 7.6 | 8.2 | 8.0 | 11.8 |
| EMBODIMENT SAMPLE 10 | 10.0 | 20.0 | 0.5 | 6.8 | 7.6 | 7.5 | 9.8 |
| EMBODIMENT SAMPLE 11 | 8.0 | 20.0 | 0.4 | 7.3 | 8.0 | 7.8 | 11.2 |
| COMPARATIVE SAMPLE 4 | 36.0 | 20.0 | 1.8 | 7.2 | 8.6 | 8.5 | 13.5 |
| COMPARATIVE SAMPLE 5 | 6.0 | 20.0 | 0.3 | 7.5 | 8.8 | 8.6 | 12.3 |

FIG. 17

| | Pet | Pw | Pet/Pw | DOW0 | DOW1 | DOW9 | DOW999 |
|---|---|---|---|---|---|---|---|
| EMBODIMENT SAMPLE 12 | 38.0 | 32.0 | 1.2 | 7.8 | 8.9 | 8.6 | 9.3 |
| EMBODIMENT SAMPLE 13 | 51.2 | 32.0 | 1.6 | 8.2 | 9.8 | 9.4 | 9.8 |
| EMBODIMENT SAMPLE 14 | 60.0 | 32.0 | 1.9 | 8.6 | 10.6 | 10.3 | 11.8 |
| EMBODIMENT SAMPLE 15 | 22.4 | 32.0 | 0.7 | 8.1 | 9.9 | 9.2 | 9.9 |
| EMBODIMENT SAMPLE 16 | 12.8 | 32.0 | 0.4 | 8.8 | 11.2 | 9.8 | 11.6 |
| COMPARATIVE SAMPLE 6 | 9.6 | 32.0 | 0.3 | 9.0 | 12.3 | 11.6 | 13.9 |

FIG. 18

| | Tet | Tmp | Tet/Tmp | DOW0 | DOW1 | DOW9 | DOW999 |
|---|---|---|---|---|---|---|---|
| EMBODIMENT SAMPLE 17 | 0.18 | 0.23 | 0.8 | 7.2 | 9.2 | 8.5 | 9.2 |
| EMBODIMENT SAMPLE 18 | 0.23 | 0.23 | 1.0 | 7.6 | 9.7 | 8.8 | 9.7 |
| EMBODIMENT SAMPLE 19 | 0.30 | 0.23 | 1.3 | 7.8 | 11.2 | 10.6 | 11.2 |
| EMBODIMENT SAMPLE 20 | 0.12 | 0.23 | 0.5 | 7.5 | 9.6 | 9.1 | 9.5 |
| EMBODIMENT SAMPLE 21 | 0.07 | 0.23 | 0.3 | 7.9 | 11.9 | 10.3 | 11.4 |
| COMPARATIVE SAMPLE 7 | 0.35 | 0.23 | 1.5 | 8.1 | 12.3 | 12.1 | 12.6 |
| COMPARATIVE SAMPLE 8 | 0.02 | 0.23 | 0.1 | 8.3 | 13.8 | 13.5 | 13.5 |

| | Tet | Tmp | Tet/Tmp | DOW0 | DOW1 | DOW9 | DOW999 |
|---|---|---|---|---|---|---|---|
| EMBODIMENT SAMPLE 22 | 0.16 | 0.23 | 0.7 | 6.6 | 7.2 | 7.4 | 7.9 |
| EMBODIMENT SAMPLE 23 | 0.23 | 0.23 | 1.0 | 6.8 | 8.2 | 8.3 | 9.9 |
| EMBODIMENT SAMPLE 24 | 0.28 | 0.23 | 1.2 | 7.1 | 8.4 | 9.9 | 11.8 |
| EMBODIMENT SAMPLE 25 | 0.09 | 0.23 | 0.4 | 6.9 | 8.1 | 8.6 | 9.8 |
| EMBODIMENT SAMPLE 26 | 0.05 | 0.23 | 0.2 | 7.2 | 8.3 | 10.0 | 11.2 |
| COMPARATIVE SAMPLE 9 | 0.32 | 0.23 | 1.4 | 7.3 | 8.5 | 11.1 | 13.5 |
| COMPARATIVE SAMPLE 10 | 0.02 | 0.23 | 0.1 | 7.5 | 8.6 | 10.8 | 12.3 |

| | Tet | Tmp | Tet/Tmp | DOW0 | DOW1 | DOW9 | DOW999 |
|---|---|---|---|---|---|---|---|
| EMBODIMENT SAMPLE 27 | 0.21 | 0.23 | 0.9 | 7.8 | 8.9 | 8.6 | 9.3 |
| EMBODIMENT SAMPLE 28 | 0.28 | 0.23 | 1.2 | 8.2 | 9.5 | 9.1 | 9.8 |
| EMBODIMENT SAMPLE 29 | 0.35 | 0.23 | 1.5 | 9.3 | 9.8 | 10.6 | 11.8 |
| EMBODIMENT SAMPLE 30 | 0.14 | 0.23 | 0.6 | 8.4 | 9.3 | 9.3 | 9.9 |
| EMBODIMENT SAMPLE 31 | 0.09 | 0.23 | 0.4 | 9.1 | 9.7 | 10.5 | 11.6 |
| COMPARATIVE SAMPLE 11 | 0.39 | 0.23 | 1.7 | 9.6 | 12.3 | 12.8 | 13.6 |
| COMPARATIVE SAMPLE 12 | 0.05 | 0.23 | 0.2 | 10.1 | 15.2 | 14.0 | 13.6 |

OPTICAL RECORDING METHOD, OPTICAL RECORDING APPARATUS AND OPTICAL STORAGE MEDIUM

CROSS-REFERENCE TO RELATED APPLICATIONS

This application is based on and claims the benefit of priority from the prior Japanese Patent Application No. 2004-379542 filed on Dec. 28, 2004 and No. 2005-266508 filed on Sep. 14, 2005, the entire contents of which are incorporated herein by reference.

BACKGROUND OF THE INVENTION

The present invention relates to an optical storage medium in or from which data is recorded, erased or reproduced with irradiation of a light beam (for example, a laser beam), and also an optical recording method and apparatus for such an optical storage medium.

Phase-change optical storage media are data-rewritable storage media utilizing a reversible change phenomenon between a crystalline phase and an amorphous phase, such as, modern CD-RW, DVD-RW and DVD-RAM. Especially, DVD-RW and DVD-RAM are used for recording and rewriting a large capacity of data, such as video data. What are required for phase-change optical storage media now increasingly popular for video recorders, personal computers, etc., are high-density recordability for long-time recording and storage of a large capacity of data, in addition to recording and overwrite characteristics.

One particular technique that allows a larger storage capacity for phase-change optical storage media is to make physically smaller a signal to be recorded to raise recording density per unit of area. Known methods for such a smaller signal are, for example, shorting a wavelength of a laser beam for recording and increasing an aperture ratio (NA) for an objective lens.

An example using such methods is a Blu-ray disc with 23 GB/surface area in recording density compared to 4.7 GB/surface area for DVDs. A recording/reproducing apparatus for Blu-ray discs employs a 405 nm-laser beam with 0.85 in NA for an objective lens different from a 660 nm-laser beam with 0.60 in NA for DVDs.

Another technique that allows a larger storage capacity for phase-change optical storage media is a multi-layered structure (multi-layered storage medium) in which several recording films are stacked. Already in the market is DVD-ROM with a dual-layer structure of two recording films. The same idea has been applied to write-once and rewritable types (DVD-R, DVD-RW, etc.) to achieve about double and quadruple recording density for dual and quadruple layers, respectively.

Also already in the market are write-once dual-layer storage media having two organic-resin recording films, such as, DVD+R and dual-layer (DL) discs.

Such high density multi-layered storage media accept a long-wavelength laser beam and a conventional low-NA objective lens, thus recordable and reproducible with a conventional pick-up, which achieves low prices for recording/reproducing apparatus.

Discussed below are a known phase-change optical storage medium (single-layer optical storage medium) with a single rewritable recording film and a recording method for such a storage medium.

A known single-layer optical storage medium has a structure in which at least a dielectric film, a recording film, another dielectric film and a reflective film are stacked in order on a substrate having a bottom surface to be irradiated with a laser beam carrying a recording or reproducing power, or an erasing power.

In recording, recording pulses are applied (emitted) onto a recording film with a laser beam having a specific power, to melt and rapidly cool down the recording film, thus forming amorphous recorded marks thereon.

Reflectivity of the recorded marks lower than that of the crystalline-phase recording film allows optical reading of the marks as recorded data.

In erasing the recorded marks, a laser beam having a constant power (erasing power) lower than the recording power is emitted onto the recording film. The laser beam raises the temperature thereof to the crystallization temperature or higher but lower than the melting point to change the recording film from the amorphous phase to the crystalline phase to erase the recorded marks, thus overwriting being enabled.

A basic structure of a multi-layered phase-change optical storage medium is such that two or more of layer structures are provided on a substrate. Each layer structure has at least a dielectric film, a recording film, another dielectric film and a reflective film, like the single-layer optical storage medium discussed above.

In the following discussion, a layer structure having a recording film in addition to several kinds of films is referred to as a data layer.

Japanese Unexamined Patent Publication No. 2003-45085 discloses a phase-change optical storage medium having two or more of phase-change data layers each including a recording film. Excellent erasability is achieved with adjustments to the thickness and thermal conductivity of a protective film and a heat dissipation film that constitute each data layer, in addition to the recording film.

Confirmed by the inventor of the present invention in this phase-change optical storage medium are: comparatively acceptable C/N for 3T (unit clock cycle)-marks, whereas unacceptable overwrite characteristics (under adjustments to the thickness and thermal conductivity of the protective and heat dissipation films) to recording with a modulated signal which is actually used in data recording, such as, a random signal under 8-16 modulation.

The inventor of the present invention examined advantages discussed in Japanese Unexamined Patent Publications No. 2003-6923 (adjustments to the thermal conductivity of the protective film at 50 W/m·deg or higher) and No. 2003-242687 (selection of cubic boron nitride for the heat dissipation film formed on the reflective film that constitute a data layer closer to a laser-incident surface). Nevertheless, both were unacceptable in random-signal recording discussed above.

Japanese Unexamined Patent Publications No. 2003-22572 evaluates random-signal recording with Al, Si and N as elements of a material of the protective film. Nevertheless, the inventor of the present invention confirmed unacceptable recording and overwrite characteristics.

The inventor of the present invention employed a particular recording pulse sequence in evaluation of the multi-layered phase-change optical storage media disclosed in the above Japanese Unexamined Patent Publications. This is the same as a known recording pulse sequence used in recording to single-layer phase-change optical storage media.

This known recording pulse sequence is referred to as a recording pulse sequence 1. Illustrated in FIG. 1 is a recording pulse sequence 1 for use in forming 3T and 5T recorded marks, which is disclosed, for example, in Japanese Patent No. 3266971. The sequence 1 is modulated as having a high power (Pw) pulse and a low power (Pb) pulse.

The inventor of the present invention also employed the recording pulse sequences under the 2T-multi pulse strategy defined in DVD-RW Version 1.2 and the non-multi pulse strategy defined in DVD-RAM 5×-SPEED Optional Book, and confirmed unacceptable recording and overwrite characteristics particularly on data layers, except for the one most remote from the laser-incident surface.

Recording/erasure to/from phase-change optical storage media controls a laser beam to heat/cool recording films. Under the laser control, multi-layered phase-change optical storage media require data layers, except for the one most remote from the laser-incident surface, to be highly transparent to a laser wavelength for recording/erasure.

The former data layers and the latter one are referred to as highly transparent data layers and the furthest data layer, respectively, in the following discussion.

Such highly transparent data layers have a thinner recoding film and also a thinner reflective film than the furthest data layer.

The inventor of the present invention confirmed unacceptable recording and overwrite characteristics on those highly transparent data layers under a known recording technique with the same recording pulse sequence as for the furthest data layer.

As discussed above, the multi-layered phase-change optical storage media, having the highly transparent data layers with thinner recoding films and thinner reflective films than the furthest data layer, suffer unacceptable recording and overwrite characteristic under the known recording technique.

SUMMARY OF THE INVENTION

The present invention is achieved to solve the problems discussed above and has a purpose to provide an optical recording storage medium that exhibits excellent recording and overwrite characteristics over several data layers, and also an optical recording method and an optical recording apparatus for such an optical recording storage medium.

The present invention provides an optical recording method for a phase-change optical storage medium having a beam-incident surface and a plurality of data layers provided over the surface, each data layer having at least a recording film, comprising the steps of: a modulation step of modulating data to be recorded to generate modulated data; a mark-length generation step of generating desired mark-length data based on the modulated data; and a recording step of emitting a recording beam onto each data layer based on the mark-length data, thus forming a recorded mark carrying the data to be recorded in each data layer, in which, when forming a recorded mark in a first data layer located most remote from the beam-incident surface among the data layers, generating a first recording pulse sequence having at least a first recording pulse carrying a first erasing power and a first recording power rising from the first erasing power, and a first cooling pulse carrying a first bottom power lower than the first erasing power, and emitting a recording beam onto the first data layer in accordance with the first recording pulse sequence, whereas when forming a recorded mark in a second data layer different from the first data layer among the data layers, generating a second recording pulse sequence having at least a second recording pulse carrying a second erasing power and a second recording power rising from the second erasing power, a second cooling pulse carrying a second bottom power lower than the second erasing power, and an erasing top pulse carrying an erasing top power higher than the second erasing power, and emitting a recording beam onto the second data layer in accordance with the second recording pulse sequence.

Moreover, the present invention provides an optical recording apparatus for a phase-change optical storage medium having a beam-incident surface and a plurality of data layers provided over the surface, each data layer having at least a recording film, comprising: an encoder to modulate data to be recorded to generate modulated data; a mark-length generator to generate desired mark-length data based on the modulated data; a controller to determine whether to record the data to be recorded in a first data layer located most remote from the beam-incident surface among the data layers or a second data layer different from the first data layer and generate an instruction signal based on the determination; a focus and tracking controller to control focusing and tracking to the first or the second data layer, based on the instruction signal; and a recorder to emit a recording beam onto each data layer based on the mark-length data, thus forming a recorded mark carrying the data to be recorded in each data layer, based on the instruction signal in which, when forming a recorded mark in the first data layer, the recorder generates a first recording pulse sequence having at least a first recording pulse carrying a first erasing power and a first recording power rising from the first erasing power, and a first cooling pulse carrying a first bottom power lower than the first erasing power, and emitting a recording beam onto the first data layer, whereas when forming a recorded mark in the second data layer, the recorder generates a second recording pulse sequence having at least a second recording pulse carrying a second erasing power and a second recording power rising from the second erasing power, a second cooling pulse carrying a second bottom power lower than the second erasing power, and an erasing top pulse carrying an erasing top power higher than the second erasing power, and emitting a recording beam onto the second data layer.

Furthermore, the present invention provides a phase-change optical storage medium comprising: a beam-incident surface via which a light beam is incident; a plurality of data layers provided over the beam-incident surface, each data layer having at least a recording film, a first data layer being located most remote from the beam-incident surface among the data layers, and a second data layer being different from the first data layer; and a specific data area, at least stored in which is identification data that indicates usage of a first recording pulse sequence in forming a recorded mark in the first data layer or a second recording pulse sequence in forming a recorded mark in the second data layer, the first recording pulse sequence having at least a first recording pulse carrying a first erasing power and a first recording power rising from the first erasing power, and a first cooling pulse carrying a first bottom power lower than the first erasing power, the second recording pulse sequence having at least a second recording pulse carrying a second erasing power and a second recording power rising from the second erasing power, a second cooling pulse carrying a second bottom power lower than the second erasing power, and an erasing top pulse carrying an erasing top power higher than the second erasing power.

BRIEF DESCRIPTION OF DRAWINGS

FIG. 9 is a table listing optical and thermal characteristics of each film of a highly transparent data layer of an optical storage medium according to the present invention;

FIG. 10 is a table listing thickness of each film of the highly transparent data layer and several parameters of recording pulse sequences 1 and 2 shown in FIGS. 1 and 4, respectively, at light transmissivity of 30%, 50% and 70%;

FIG. 16 is a table showing recording requirements and measured DOW-jitter levels for embodiment samples 2 to 6 and comparative samples 2 and 3 of the embodiment of an optical storage medium according to the present invention;

FIG. 17 is a table showing recording requirements and measured DOW-jitter levels for embodiment samples 7 to 11 and comparative samples 4 and 5 of the embodiment of an optical storage medium according to the present invention;

FIG. 18 is a table showing recording requirements and measured DOW-jitter levels for embodiment samples 12 to 16 and a comparative sample 6 of the embodiment of an optical storage medium according to the present invention;

DETAILED DESCRIPTION OF PREFERRED EMBODIMENTS

Figure 2:
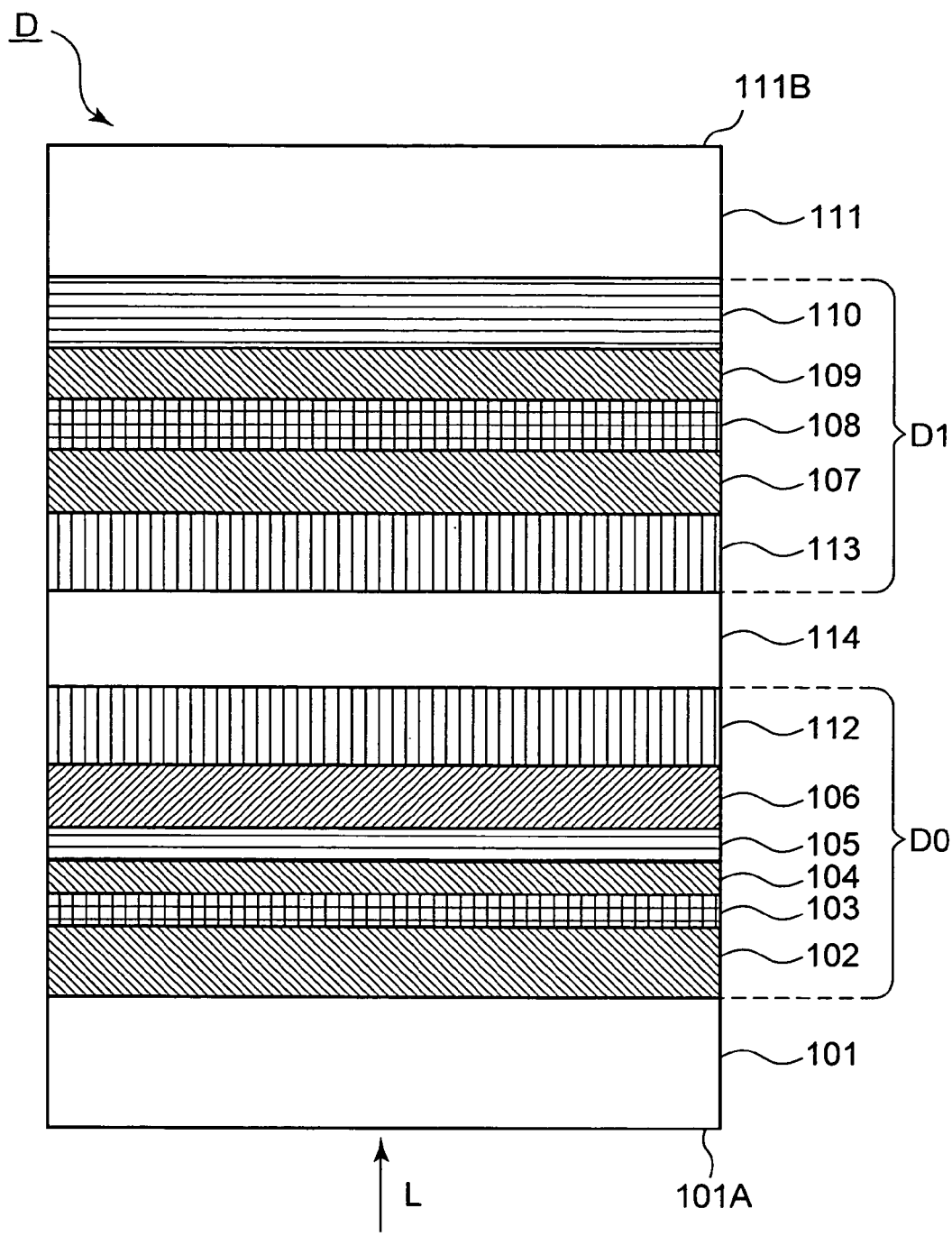
FIG. 2 is an enlarged cross section illustrating an embodiment of an optical storage medium according to the present invention.
Figure 3:
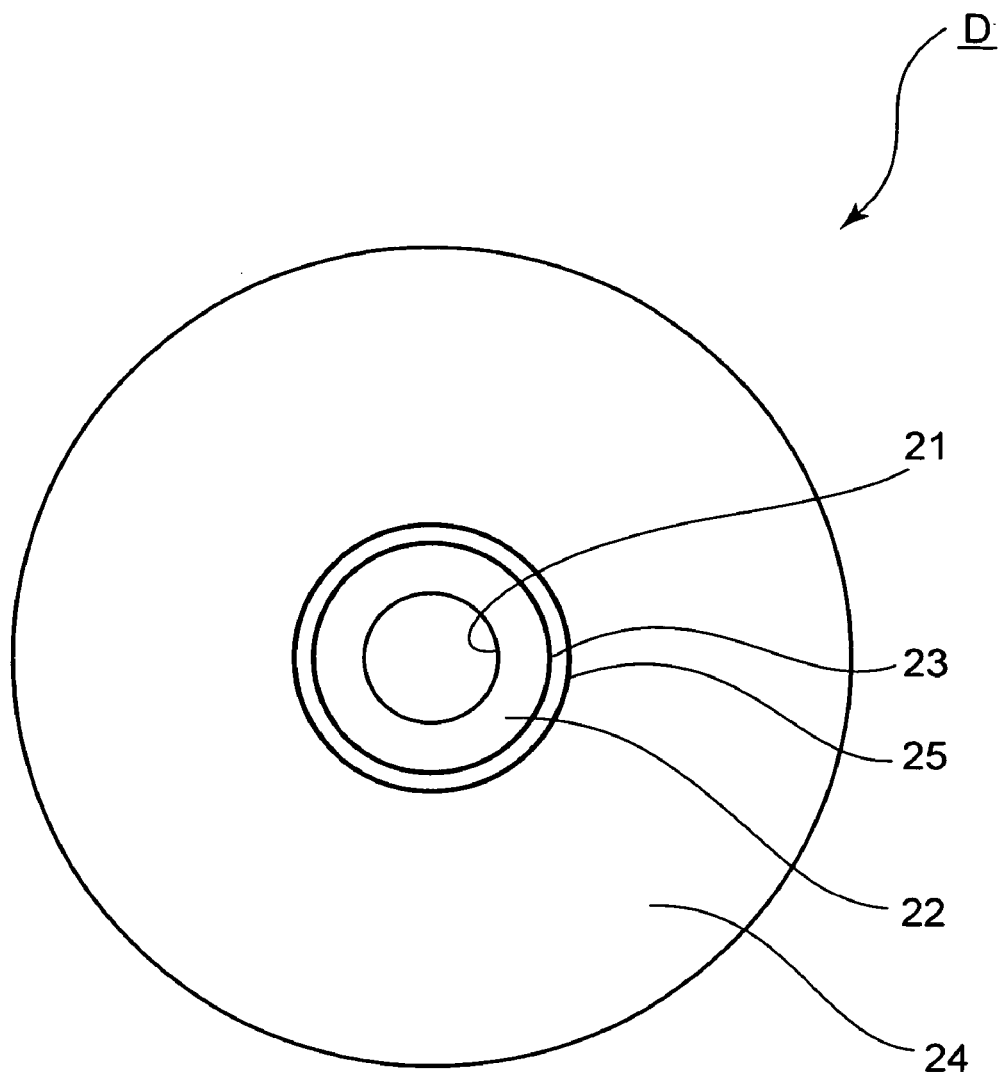
FIG. 3 is a plan view illustrating an embodiment of an optical storage medium according to the present invention.

Disclosed below with reference to FIGS. 2 and 3 is a preferred embodiment of a phase-change optical storage medium D (multi-layered optical storage medium) having several data layers, according to the present invention. The optical storage medium D in this embodiment is a dual-layer phase-change optical storage medium.

Representative of phase-change optical storage media are phase-change optical discs such as DVD-RW, media capable of repeatedly overwriting data such as optical cards, and so on. A phase-change optical disc (the optical storage medium D) is described in the following description as an embodiment of the present invention. It will, however, be appreciated that the present invention is applicable to other types of phase-change optical storage media such as optical cards.

The dual-layer optical storage medium D shown in FIG. 2 includes a first data layer D0 and a second data layer D1. The first data layer D0 is formed on a first disc substrate 101 having a bottom surface that is a beam incident surface 101A on which a recording or reproducing laser beam, or an erasing laser beam is incident in a direction L. The second data layer D1 is formed on a second substrate 111 having a surface 111B for labeling. The layers D0 and D1 are bonded to each other with a transparent adhesive layer 114.

A layer having a recording film in addition to several kinds of films is referred to as a data layer in the following disclosure.

The data layer D0 has a structure in which a first protective film 102, a first recording film 103, a second protective film 104, a first reflective film 105, an optical adjustment film 106 and a third protective 112 are stacked in order on the first substrate 101 having the beam incident surface 101A on the opposite side.

The data layer D1 has a structure in which a second reflective film 110, a fourth protective film 109, a second recording film 108, a fifth protective film 107, and a sixth protective film 113 are stacked in order on the second substrate 111 having the surface 111B for labeling on the opposite side.

The transparent adhesive layer 114 is placed between the third protective film 112 of the data layer D0 and the sixth protective film 113 of the data layer D1, to bond the films 112 and 113 to each other. The adhesive layer 114 may be a UV (ultra-violet)-curable resin or a double-sided adhesive sheet. The thickness of the layer 114 is about 20 to 50 μm as transparent to wavelengths of laser beams in recording, reproduction and erasure.

In the following disclosure, data layers are defined as follows: the furthest data layer that is a data layer most remote from a beam incident surface on which a laser beam is incident; and a highly transparent data layer that is any data layer closer to the beam incident surface than the furthest data layer.

Accordingly, in the multi-layered optical storage medium D shown in FIG. 2, the data layer D0 and the data layer D1 are defined as the highly transparent data layer D0 and the furthest data layer D1, respectively.

The highly transparent data layer D0 has to be transparent to laser beams for recording and reproduction to and from the furthest data layer D1. Thus, the highly transparent data layer D0 in the dual-layer optical storage medium D requires light transmissivity of 50% or higher for those beams.

In addition, highly transparent data layers in a multi-layered optical storage medium having three or more of data layers require light transmissivity of 70% or higher for laser beams in recording and reproduction to and from the furthest data layer.

In other words, the furthest data layer in dual-layer optical storage media and also multi-layered optical storage media having three or more of data layers need not be transparent to a laser beam for any more remote data layer than the furthest data layer from the beam incident surface, which do not actually exist. Thus, a recording film, reflective film, etc., for the furthest data layer can be formed thick enough for excellent recording characteristics. This means that a weak laser beam attenuated through the highly transparent data layers can be used in recording, reproduction or erasure to or from the furthest data layer.

In this embodiment, a highly transparent data layer exhibits light transmissivity Tr in the range from 30 to 70% for a laser wavelength to be used in recording.

Suitable materials for the first substrate 101 and the second substrate 111 are several types of transparent synthetic resins, a transparent glass, and so on, for example, glass, polycarbonate, polymethylmethacrylate, polyolefin, epoxy resin, or polyimide. The most suitable material is polycarbonate resin for low birefringence and hygroscopicity, and also easiness to process.

The thickness of the first reflective film 105 in the highly transparent data layer D0 is preferably 15 nm or thinner for a laser beam traveling towards the furthest data layer D1, as discussed above. The thickness of the second reflective film 110 in the furthest data layer D1 is preferably in the range from 50 to 300 nm, depending on thermal conductivity of a metal or an alloy by which the reflective film 110 is made. A thicker reflective film 110 at 50 nm or more does not optically vary and hence stable in reflectivity but affects a cooling rate. Thickness over 300 nm requires a longer production time. A material exhibiting a high thermal conductivity allows the second reflective film 110 to have a thickness in an optimum range such as mentioned above.

Recording films exhibit high light absorption like reflective films. Thus, the thickness of the first recording film 103 in the highly transparent data layer D0 is preferably 15 nm or thinner for a laser beam traveling towards the furthest data layer D1. The thickness of the second recording film 108 in the furthest data layer D1 is preferably in the range from 10 to 25 nm for maximum light absorption. Suitable materials for the recording films 103 and 108 are, for example, an eutectic crystal of GeSbTe, a compound of SbTe, and materials including Sb as a major element, such as, GaSb and GeSb, for high speed crystallization and high storageability.

The reflectivity of the optical adjustment film 106 in the highly transparent data layer D0 is preferably higher for higher light transmissivity Tr for the data layer D0, with lower attenuation coefficient as possibly as close to zero. Suitable materials for the adjustment film 106 are a mixture of ZnS and $SiO_2$, an oxide or a nitride, such as, $Al_2O_3$, $Ta_2O_5$, $Nb_2O_5$, $TiO_2$, and GeN. The thickness of the film 106 is preferably thin for maximum transmissivity Tr and high productivity.

The optical storage medium D in the present invention may not be limited to that shown in FIG. 2. An alternative is as follows: At least, the first protective film 102, the first recording film 103, the second protective film 104, and the first reflective film 105 are stacked in order on the first substrate 101 to form a highly transparent data layer D0. A UV-curable resin is applied on the data layer D0 and exposed to UV rays to be cured while pressed with a transparent stamper for use in transfer of recoding grooves. After the stamper is removed, at least, the fifth protective film 107, the second recording film 108, the fourth protective film 109, and the second recording film 110 are stacked in order on the data layer D0 to form the furthest data layer D1. Finally, the second substrate 111 is bonded to the data layer D1.

FIG. 3 is a plan view illustrating the optical storage medium D. The optical storage medium D has a center hole 21 and a clamp area 22 therearound. Provided concentrically around the clamp area 22 is a data area (read-in area) 23 and an optimum power control zone 25 (OPC zone) provided around which is a recording area 24 that stores actual data such as video data and audio data. The read-in area 23 may be in a condition like ROM (Read Only Memory) or RAM (Random Access Memory). Alternatively, a high-frequency wobble or bits can be formed in a laser guide groove for gaining a tracking signal, as carrying read-only recorded identification data.

The identification data recorded in the read-in area 23 are several recording requirements, such as, recording pulse sequence data for use in switching of the recording pulse sequence to be used in formation of recorded marks on the furthest data layer and the highly transparent data layer based on data to be recorded, and recording parameters (recording requirements), such as, a recording laser strength (recording power Pw, erasing power Pe, and erasing top power Pet) and a laser applying time (pulse width). The identification data may further include the type of the optical storage medium D, any information on a manufacture of the storage medium D, the number of data layers in the storage medium D, a light transmissivity Tr of each data layer, etc.

[Recording Method for Optical Storage Medium]

A recording method in the present invention employs different recording pulse sequences to a plurality of different data layers. For example, this embodiment employs the recording pulse sequence 1 shown in FIG. 1 and another recording pulse sequence 2 shown in FIG. 4.

Figure 4:
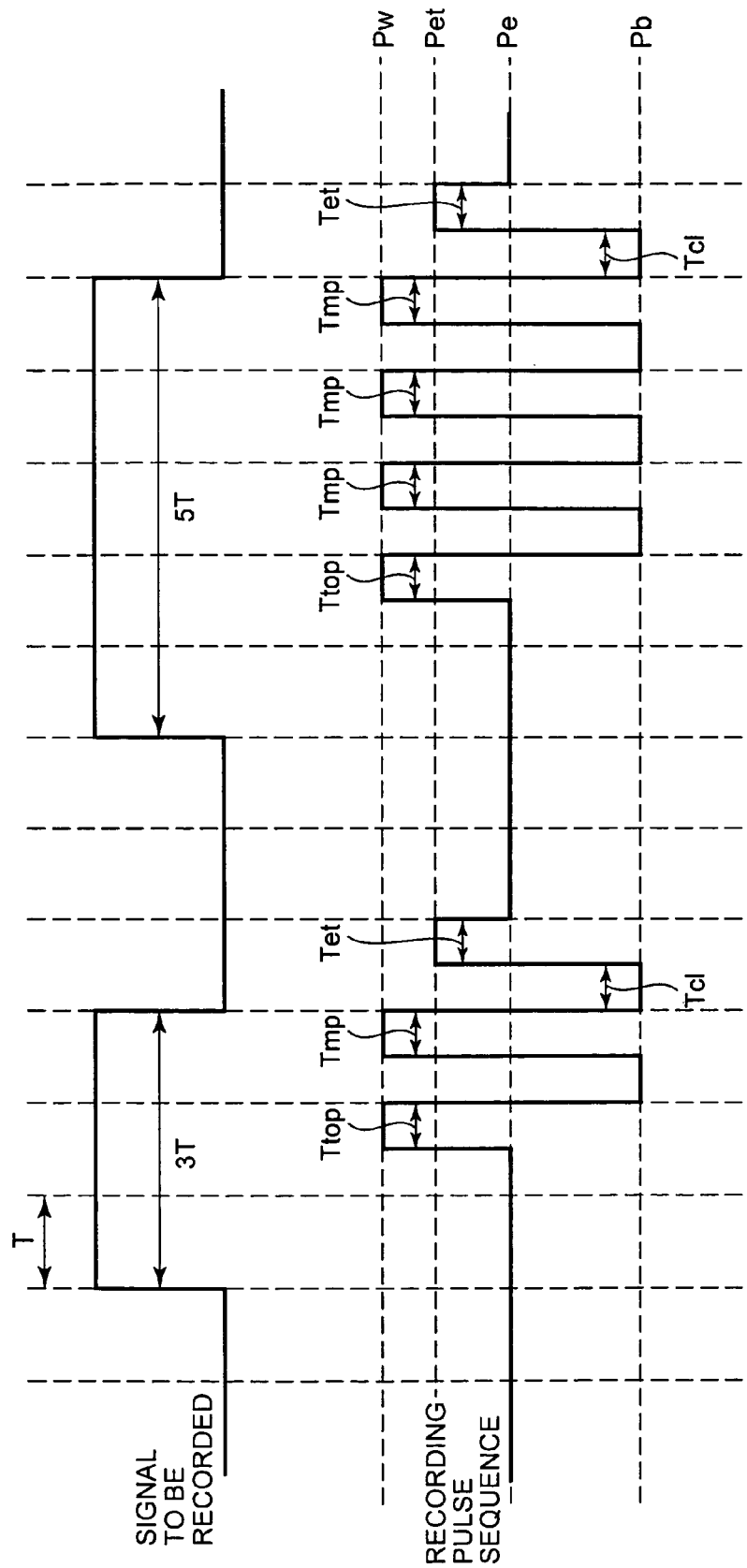
FIG. 4 is a view illustrating an example of a recording pulse sequence 2 according to the present invention.

The recording pulse sequence 2 shown in FIG. 4 is just an example of a recording pulse sequence. It consists of the recording pulse sequence 1 shown in FIG. 1 with an erasing top pulse Tet that ascends to an erasing top power Pet higher than an erasing power Pe and descends to the erasing power Pe, next to a cooling pulse Tcl that is the last pulse in the pulse sequence 1.

In recording, a laser beam is modulated with laser strength at four levels (a recording power Pw, an erasing power Pe, a bottom power Pb, and an erasing top power Pet: Pw>Pe>Pb and Pet>Pe) based on the recording pulse sequence 2, with increase or decrease in the number of pulses in accordance with a given mark length, to form recorded marks on a recording film.

As illustrated in FIG. 4, the recording pulse sequence 2 consists of: a top pulse Ttop that rises from the erasing power Pe for initially applying a laser beam onto a recording film with the recording power Pw; multipulses Tmp (which may consist of one pulse depending on a signal to be recorded, as shown in FIG. 4) that follow the top pulse Ttop, for alternatively applying the recording power Pw and the bottom power Pb; the cooling pulse Tcl that ascends from the bottom power Pb to the erasing power Pe; and the erasing top pulse Tet that applies the erasing top power Pet. The erasing top pulse Tet is the last pulse in the sequence 2 that corresponds to the end of each recorded mark. The top pulse Ttop and the multipulses Tmp constitute a heating pulse (a recording pulse) for forming a recorded mark on a recording film. There is a recording pulse that is formed only by the top pulse Ttop with no multipulses Tmp.

For example, in DVD-RW, there are ten types of mark length, that is, 3T, 4T, 5T, 6T, 7T, 8T, 9T, 10T, 11T, and 14T. In general, the number of the top pulse Ttop and the multipulses Tmp for applying the recording power Pw is n or (n−1) when a mark length is expressed as nT. FIG. 4 indicates (n−1) for the top pulse and multipulses. Here, T indicates a unit clock cycle, 1T=38.2 ns at DVD×1 speed (disc rotation speed: 3.84 m/s), 1T=9.6 ns at DVD×4 speed (disc rotation speed: 15.4 m/s) for dual-layer DVD.

Figure 5:
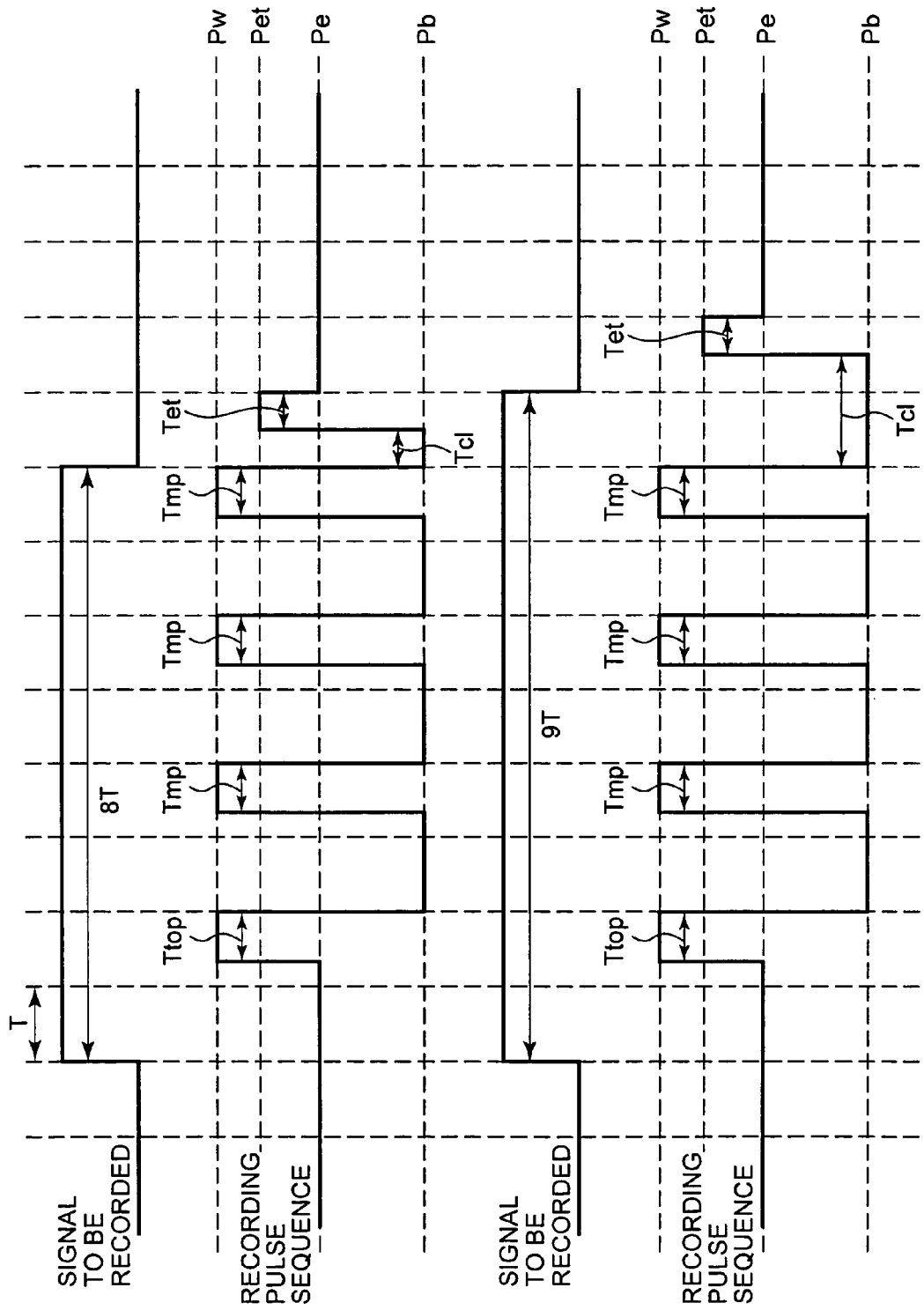
FIG. 5 is a view illustrating an example of a 2T-based recording pulse sequence 2 according to the present invention.
Figure 6:
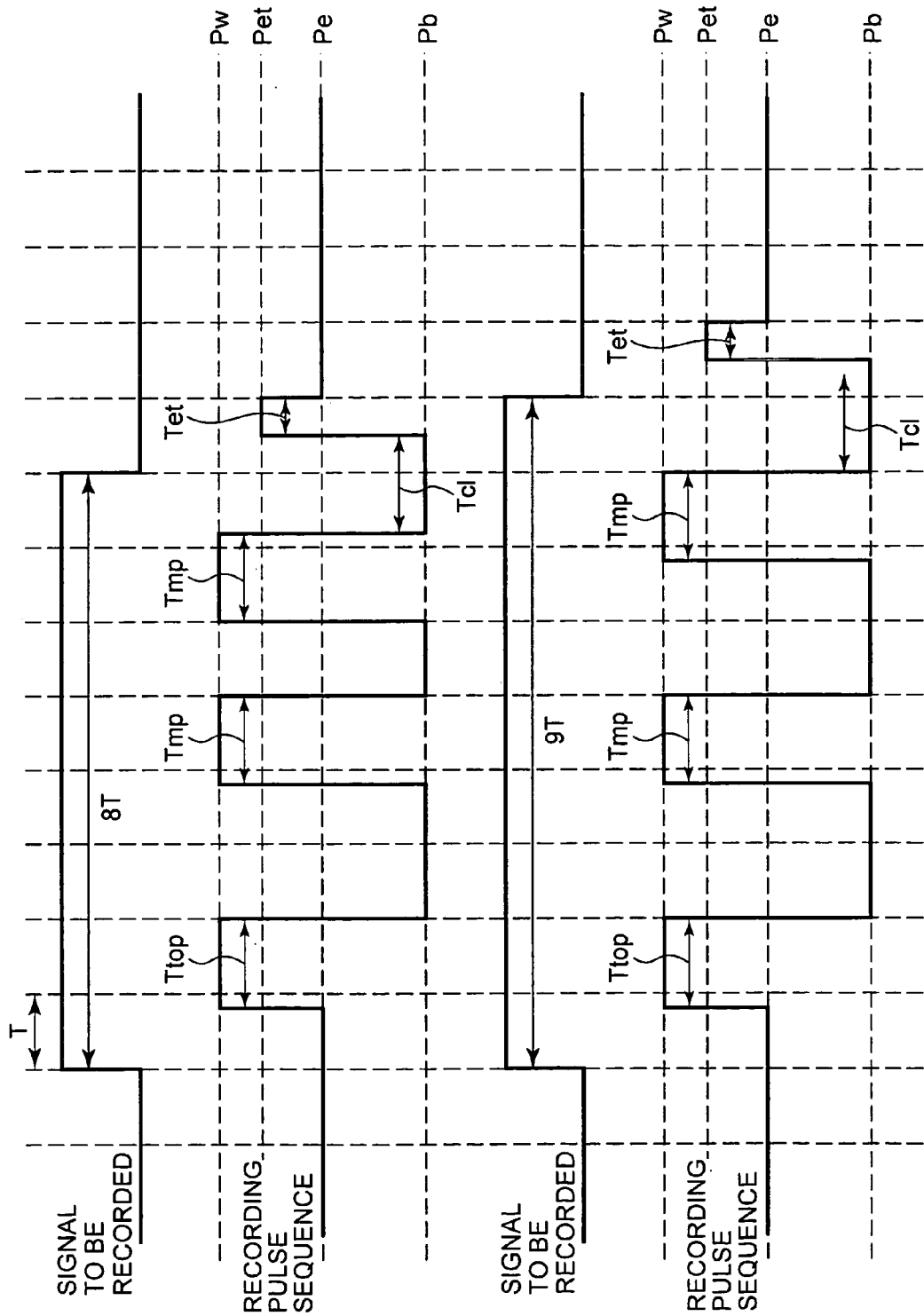
FIG. 6 is a view illustrating an example of a 3T-based recording pulse sequence 2 according to the present invention.

2T- and 3T-based recording pulse sequences, such as shown in FIGS. 5 and 6, respectively, are applicable to modern high-speed recording techniques with a short unit clock on the order of several nanoseconds, in view of the limit of response of laser pulses in raising and falling. These 2T- and 3T-based recording pulse sequences can be used in forming 8T and 9T marks.

Figure 7:
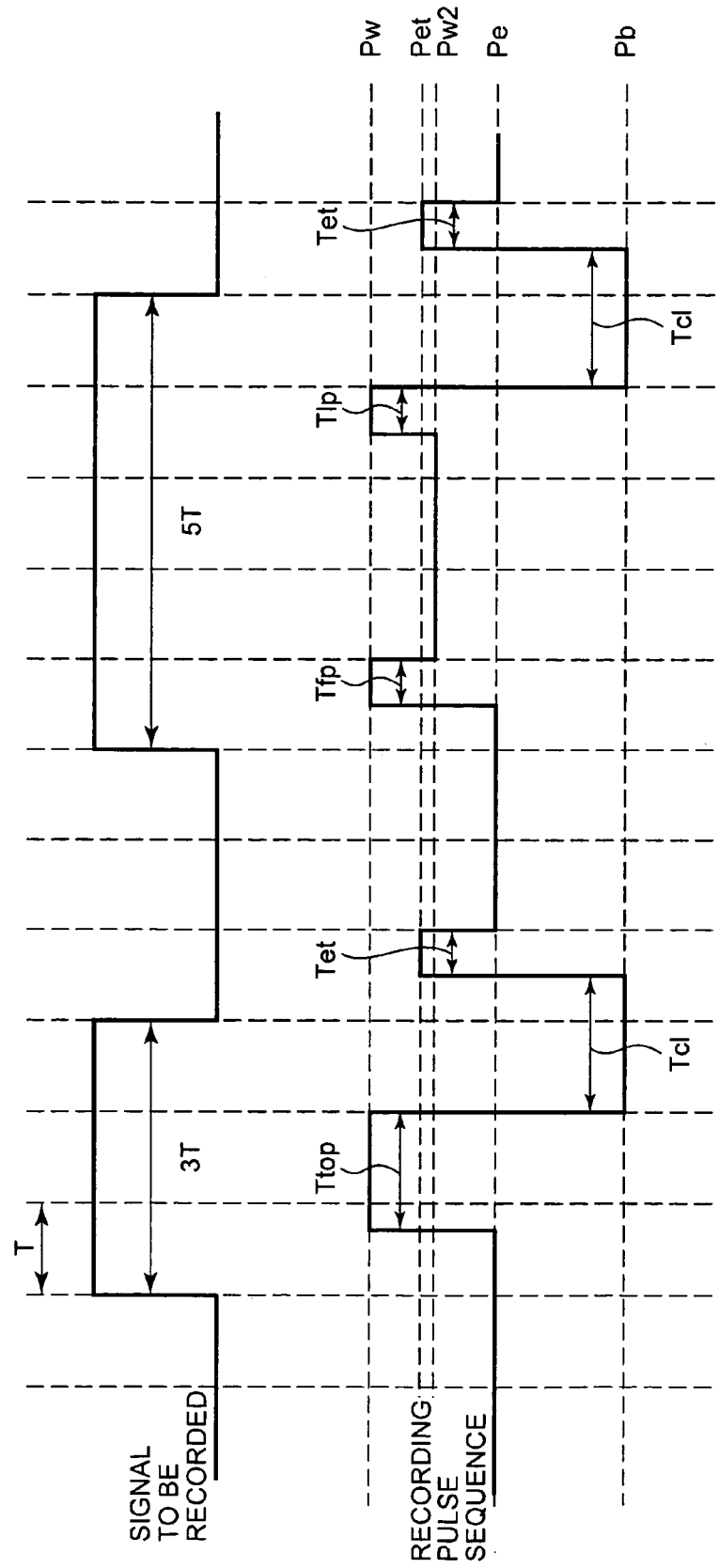
FIG. 7 is a view illustrating an example of a non-multipulse recording pulse sequence 2 according to the present invention.

A non-multipulse type recording pulse sequence, such as shown in FIG. 7, is applicable to high-speed storage media (for example, DVD-R×4 speed), depending on the material of a recording film. The non-multipulse type sequence shown in FIG. 7 is for use in forming 3T and 5T marks. It consists of the top pulse Ttop that rises from the erasing power Pe for initially applying a laser beam onto a recording film with the recording power Pw and the cooling pulse Tcl that ascends from the bottom power Pb to the erasing power Pe. Or, it consists of a non-multi top pulse Tfp, a non-multi last pulse Tlp, and the cooling pulse Tcl that follows the pulse Tlp, with a constant power higher than the erasing power Pe but lower than the recording power Pw between the top and last pulses Tfp and Tlp. A non-multipulse type sequence for use in forming 3T marks consists of the top pulse Ttop, the cooling pulse Tcl and the erasing top pulse Tet. A non-multipulse type sequence for use in forming 5T marks consists of: the non-multi top pulse Tfp that ascends from the erasing power Pe to the recording power Pw, and then to another recording power Pw2 that is lower than the recording power Pw but higher than the erasing power Pe; the non-multi last pulse Tlp that ascends from the recording power Pw2 to the recording power Pw; the cooling pulse Tcl; and the erasing top pulse Tet.

[Optical Recording Apparatus]

Figure 8:
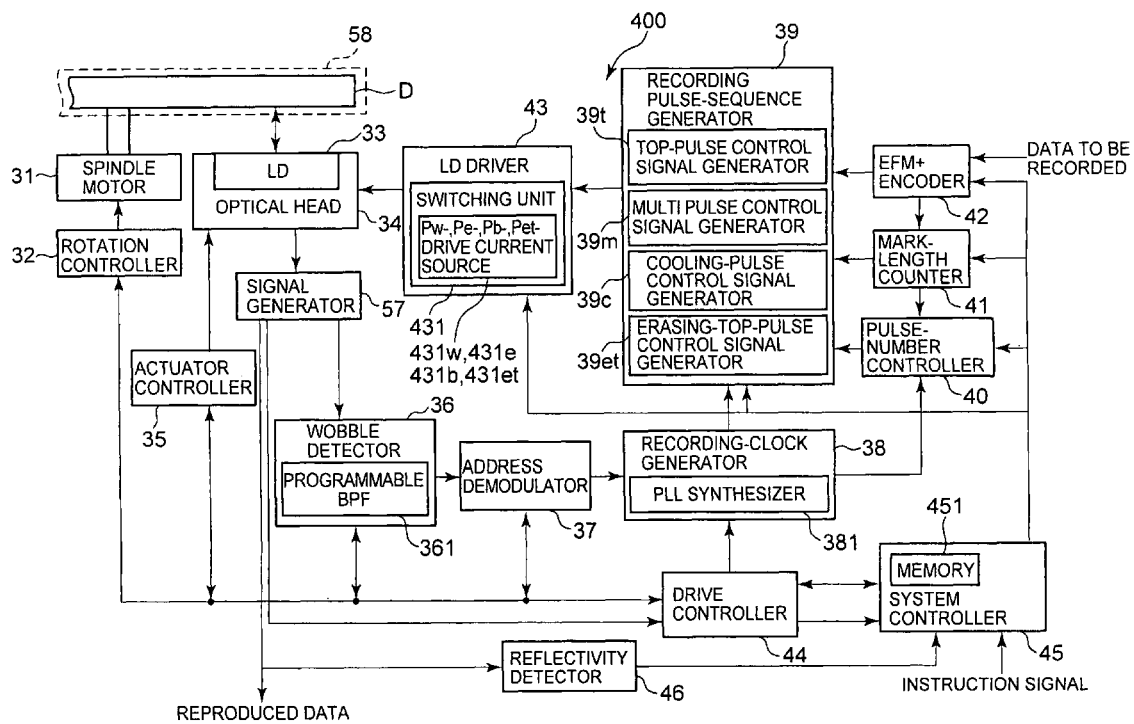
FIG. 8 is a block diagram of an embodiment of an optical recording apparatus according to the present invention.

FIG. 8 shows an embodiment of an optical recording apparatus according to the present invention, for emitting a laser beam modulated with a specific recording pulse sequence onto the optical storage medium D.

The optical storage medium D is rotated by a spindle motor 31. The spindle motor 31 is controlled by a rotation controller 32 so that its rotating speed reaches a recording linear velocity corresponding to a target recording speed. Provided as movable in the radius direction of the optical storage medium D is an optical head 34 equipped with a semiconductor laser (LD) 33 for use in recording, reproduction or erasing, an objective lens (not shown) for focusing a laser beam from the LD 33, and a quadrant photo-detector (not shown).

A recommendable light source for recording in the optical recording apparatus of this embodiment is a high-intensity light source of a laser beam or strobe light, for example. The most recommendable is a semiconductor laser for compactness, low power consumption and easiness in modulation.

The quadrant photo-detector of the optical head 34 receives a beam reflected from the optical storage medium D while the medium D is irradiated with the laser beam from the LD 33. The reflected beam is supplied to a signal generator 57 for producing a push-pull signal, a focus error signal, a tracking error signal, and a reproduced signal (RF signal) that is a composite signal from the quadrant photo-detector. The push-pull signal is supplied to a wobble detector 36. The focus and tracking error signals are supplied to a drive controller 44. The RF signal is supplied to the drive controller 44 and a reflectivity detector 46.

The drive controller 44 controls an actuator controller 35 based on the supplied focus and tracking error signals. The actuator controller 35 controls the optical head 34 in focusing and tracking to the optical storage medium D. Also controlled by the drive controller 44 are a rotation controller 32, the wobble detector 36, an address demodulator 37, and a recording-clock generator 38, which will be discussed later. The drive controller 44 and other several units are under control by a system controller 45, which will be discussed later.

The wobble detector 36, equipped with a programmable band-pass filter (BPF) 361, outputs a detected wobble signal to the address demodulator 37. The address demodulator 37 demodulates the wobble signal and outputs address data. The address data is supplied to a recording-clock generator 38, equipped with a PLL synthesizer 381, which generates a recording-channel clock and outputs it to a recording pulse-sequence generator unit 39 and a pulse-number controller 40.

In reproduction, the optical storage medium D having the recording area 24 (FIG. 3) with data recorded therein is installed in a disc cartridge 58. The spindle motor 31 is then controlled by the rotation controller 32 so that its rotating speed reaches a recording linear velocity corresponding to a target recording speed for the optical storage medium D.

The LD 33 of the optical head 34 emits a weak laser beam for reproduction to the read-in area 23 (FIG. 3) of the optical storage medium D. The quadrant photo-detector of the optical head 34 receives a beam reflected from the optical storage medium D while the medium D is irradiated with the laser beam from the LD 33. The reflected beam is then supplied to the signal generator 57. The optical head 34 having the LD 33 and the quadrant photo-detector, and the signal generator 57 work as a reproducing unit for reproducing data from the optical storage medium D.

The signal generator 57 produces an RF signal based on the reflected beam and supplies it to the reflectivity detector 46. The detector 46 detects a positive or a negative on the gradient of variation in reflectivity on the reflected beam to determine whether the beam is reflected from the furthest data layer D1 or the highly transparent data layer D0 (FIG. 2). The optical head 34 and/or the optical storage medium D are/is adjusted in the vertical direction so that a laser beam is focused onto a target recording film.

Focusing and tracking to each recording film of the optical storage medium D is performed by the optical head 34 under control by the actuator controller 35 which works as a focus and tracking controller.

The optical head 34 outputs the reflected beam from the read-in area 24 of the optical storage medium D to the signal generator 57. The generator 57 produces an RF signal which is demodulated and output, through a demodulator (not shown), as reproduced data. The generator 57 also produces a radial push-pull signal which is then supplied to the wobble detector 36. The detector 36 detects a wobble signal and an LPP signal from the push-pull signal which are then supplied to the address demodulator 37. The demodulator 37 demodulates the LPP signal to gain address data which is then supplied to the drive controller 44.

Next, in recording, the optical storage medium D having the recording area 24 with un-recorded regions is installed in the disc cartridge 58.

The LD 33 of the optical head 34 emits a weak laser beam for reproduction to the read-in area 23 of the optical storage medium D. The quadrant photo-detector of the optical head 34 receives a beam reflected from the optical storage medium D while the medium D is irradiated with the laser beam from the LD 33. The reflected beam is then supplied to the signal generator 57. The generator 57 produces an RF signal based on the reflected beam and demodulate it to gain identification data which is then supplied to the system controller 45. The identification data carries recording pulse sequence data and recording parameters, as discussed above. The recording pulse sequence data in this embodiment includes data indicating the recording pulse sequences 1 and 2 for recording to the furthest data layer D1 and the highly transparent data layer D0, respectively.

The system controller 45 writes the identification data in its memory 451, thus controlling the drive controller 44 based on the identification data. The drive controller 44 then controls the actuator controller 35, the wobble detector 36, and the address demodulator 37, under control by the system controller 45.

The system controller 45 works as an instructor to instruct whether to record data in the highly transparent data layer D0 or the furthest data layer D1. The reflectivity detector 46 then detects a positive or a negative on the gradient of variation in reflectivity on the reflected beam to determine whether the beam is reflected from the furthest data layer D1 or the highly transparent data layer D0. The actuator controller 35 controls the optical head 34 for focusing and tracking to the data-recording instructed data layer.

The optical head 34 emits a recording laser beam to the optical storage medium D. The drive controller 44 outputs the wobble signal supplied from the wobble detector 36 to the recording-clock generator 38 and the address data from the address demodulator 37 to the system controller 45.

The demodulated address is supplied to the recording-clock generator 38, equipped with the PLL synthesizer 381, which generates a recording-channel clock and outputs it to the recording pulse-sequence generator unit 39 and the pulse-number controller 40.

The system controller 45 controls an EFM+encoder 42, a mark-length counter 41, and the pulse-number controller 40. It further controls the recording pulse-sequence generator unit 39 and an LD driver 43.

The EFM+encoder 42 modulates input data to be recorded into modulated data with 8-16 modulation and outputs it to the recording pulse-sequence generator unit 39 and the mark-length counter 41. The mark-length counter 41 works as a mark-length generator that counts intervals of inversion of the modulated data to generate mark-length data, the counted value being output to the generator unit 39 and the pulse-number controller 40. The controller 40 controls the generator unit 39 to generate specific recording pulses based on the supplied counted value and recording-channel clock.

The recording pulse-sequence generator unit 39 is equipped with a top-pulse control signal generator 39t, a multipulse control signal generator 39m, a cooling-pulse control signal generator 39c, and an erasing-top-pulse control-signal generator 39et. The generators 39t, 39m, 39c, and 39et generate a top-pulse control signal, a multipulse control signal, a cooling-pulse control signal, and an erasing-top-pulse control signal, respectively. Each control signal is supplied to the LD driver unit 43. A switching unit 431 switches a drive current source 431w for recording power Pw, a drive current source 431e for erasing power Pe, a drive current source 431b for bottom power Pb, and a drive current source 431et for erasing top power Pet, based on the supplied control signals, thus generating a recording pulse sequence.

The Pw-drive current source 431w, the Pe-drive current source 431e, the Pb-drive current source 431b, and the Pet-drive current source 431et supply currents to the optical head 34 based on a recording power Pw, an erasing power Pe, a bottom power Pb, and an erasing top power Pet prestored in the memory 451 of the system controller 45. These four power levels are optimum levels to give the optical storage medium D excellent recording characteristics. Identification data that indicates these four power levels may be prestored in the memory 451 or updated. The memory 451 is either a ROM (Read Only Memory) or a recordable RAM (Random Access Memory), for example.

The optical recording apparatus in this embodiment can set any recording linear velocity selected among a plurality of recording linear velocities for higher linear velocity (x speed) in the optical storage medium D. On receiving an instruction signal for selecting a recording linear velocity (x speed mode), the system controller 45 controls the Pw-drive current source 431w, the Pe-drive current source 431e, the Pb-drive current source 431b, and the Pet-drive current source 431et, as disclosed above, based on the identification data on an instructed recording linear velocity prestored in the memory 451. Identification data on a plurality of recording linear velocities are prestored in the memory 451, as disclosed above.

A generated recording pulse sequence is input to the optical head 34. The optical head 34 controls the LD 33 to output LD-emission waveforms carries a desired recording pulse sequence and power, thus recording data to be recorded on the optical storage medium D.

The recording-pulse generator unit 39, the LD driver unit 43, and the optical head 34 work together as a recording unit 400 that generates the recording pulse sequences 1 and 2 based on the mark-length data generated by the mark-length counter 41, and emits recording beams onto the optical storage medium D through the LD 33 in accordance with the recording pulse sequence 1 or 2, thus forming recorded marks indicating the data to be recorded.

This embodiment employs the EFM (Eight-to-Fourteen) modulation in generation of recorded mark data. Not only that, other modulation techniques, such as, 1-7 modulation, are applicable to the present invention.

The recording pulse sequences 1 and 2 in high-speed recording may require a higher recording frequency, thus resulting in unacceptable recording characteristics. This is because the optical recording apparatus employs the low-cost semiconductor laser LD 33 with a rising/falling time of at most 2 nanoseconds for emitted waveforms, thus a desired emission waveforms being not gained. In addition, the duration of a laser power based on each of the recording pulse sequences 1 and 2 has to be set at about 2 nanoseconds or more for enough heating time and cooling time.

It is thus preferable to use a 2T- or 3T-based recording pulse sequence that contributes to lower the frequency of emitted waveforms to ½ or ⅓, respectively. For example, the 2T- and 3T-based recording pulse sequences with the erasing top pulse Tet, such as shown in FIGS. 5 and 6, can offer excellent recording characteristics.

For example, in lowering the frequency of emitted waveforms to ½, the mark-length counter 41 counts intervals of inversion of the modulated data, in generation of mark-length data on an EFM signal, with respect to a recording (channel) clock (cycle T). The mark-length data on the EFM signal is supplied the recording-pulse sequence generator unit 39 from the EFM+encoder 42. Moreover, the counter 41 determines whether the counted value is an uneven or even number.

In either case in which the counted value is an uneven or even number, under control by the pulse-number controller 40, the recording pulse sequence generator unit 39 generates a recording pulse sequence in the following order: a top pulse Ttop per unit of 2T; a multipulse Tmp in each increase of the counted value by 2T; and a cooling pulse Tcl that is the last pulse in the pulse sequence, after generation of a desired number of multipulses Tmp.

The term "multipulse" is used for a single pulse Tmp or a plurality of pulses Tmp depending on a signal to be recorded, in the following disclosure.

The multipulses Tmp are generated after the 2T-based top pulse Ttop when the counted value is an uneven number whereas after the 3T-based top pulse Ttop when the counted value is an even number. Thus, the multipulses Tmp at an even number is delayed by 1T with respect to those at an uneven number, as shown in FIGS. 5 and 6.

Accordingly, the recording pulse sequences having a plurality of multipulses Tmp with the erasing top pulse Tet, such as shown in FIGS. 5 and 6, are generated. Different from these sequences, The non-multipulse type sequence having a non-multipulse sequence with the erasing top pulse Tet, such as shown in FIG. 7, is available when such a non-multipulse sequence is effective for recording characteristics.

The set levels, such as, the pulse power and the pulse width that is the duration of applying one pulse, illustrated in FIGS. 5 to 7, are typical examples for the top pulse Ttop, the cooling pulse Tcl, etc. In actual application, these levels are optimized in accordance with the material of the recording films, the layer structure in the optical storage medium D, etc.

The mark length and recording waveform discussed above may not match each other. This is because an accumulated length of a recording waveform and the length of a recorded mark are different from each other depending on modulation technique or recording density and the size of a laser spot on the optical storage medium D.

A recording apparatus with an error-rate measuring function can determine a power level of the erasing top power Pet and a pulse width of the erasing top pulse Tet for minimum error rate. This is achieved for example as follows: One-time recording and 10-time overwriting are performed to the optimum power control zone 25 (OPC zone) of the optical storage medium D, shown in FIG. 3, with a given level of the erasing top power Pet and a given pulse width of the erasing top pulse Tet that is the duration of applying one erasing top pulse Tet.

Error rates in the one-time recording and 10-time overwriting are measured in the system controller 45 (FIG. 8). The level of the erasing top power Pet and the pulse width of the erasing top pulse Tet are made larger when the measurements go beyond $1\times10^{-3}$ for 10-time overwriting even though below $1\times10^{-3}$ for one-time recording. On the contrary, the level of the power Pet and the pulse width of the pulse Tet are made smaller when the measurements go beyond $1\times10^{-3}$ for both one-time recording and 10-time overwriting. The system controller 45 adjusts the level of the power Pet and the pulse width of the pulse Tet. The controller 45 also sets the level of the power Pet and pulse width of the pulse Tet for minimum error rate. It works as a controller to control the recording-pulse sequence generator unit 39 and the LD driver 43.

The followings are several ways of setting the recording parameters indicating several optimum powers, pulse widths, timings for generating pulses, etc.

Optimum recording parameter data corresponding to disc manufactures, disc types, etc., may be prestored in the memory 451 of the system controller 45.

The identification data indicating any information on a manufacture of the optical storage medium D, the type of the medium D, etc., may be read out from the medium D by the system controller 45 and stored in the memory 451.

The recording parameter data recorded in the read-in area 23 of the optical storage medium D may be read out with a laser beam from the optical head 34 and decoded by the programmable BPF 361 of the wobble detector 36 or the system controller 45.

Optimum recording parameter data may be downloaded via the Internet and stored in the memory 451.

Or, the wobbles, bits or read-in area 23 that carry or stores optimum recording parameter data may be included in the furthest data layer D1 or the highly transparent data layer D0 of the optical storage medium D.

[Thin Film Thermal Behavior]

The inventor of the present invention presupposed that recording and overwrite characteristics of the optical storage medium D could be affected by different thermal behaviors of the furthest data layer D1 and the highly transparent data layer D0 when the same recording pulse sequence is applied, due to difference in light transmissivity Tr and thickness between the two data layers, and found out that the presumption is correct according to the following measurements. Under the findings, the inventor researched on optimum recording pulse sequences that give excellent recording and overwrite characteristics to the two data layers D0 and D1.

In the research, the inventor of the present invention used Temprofile (a registered trademark) by the U.S.A. MM Research Inc., that is a popular temperature-analysis software for simulating temperatures in a thin film with laser irradiation, under consideration of difficulty in measurements of actual thin-film temperatures and variation in temperature on the order of nanoseconds.

The optical storage medium D used in the research was a dual-layer phase-change optical storage medium, such as shown in FIG. 2, having the data layer (the highly transparent data layer) D0, that is the first data layer when viewed from the beam-incident side. Formed in the highly transparent data layer D0 are a protective (dielectric) film 102, a recording film 103, a protective (dielectric) film 104, and a reflective film 105, for light transmissivity Tr of 50%.

The recording pulse sequence 1 or 2 shown in FIG. 1 or 4, respectively, is applied to the highly transparent data layer D0 depending on the requirements discussed below.

Listed in the table of FIG. 9 are optical and thermal characteristics of each film of the highly transparent data layer D0. Listed in the table of FIG. 10 are thickness of each film of the data layer D0 and several parameters of the laser recording pulse sequence 1 or 2, at the light transmissivity Tr of 30%, 50% and 70%.

Temperature change in the recording film 103 was simulated for the highly transparent data layer D0 having several films listed in the table of FIG. 10 at the light transmissivity Tr of 50%, with the recording pulse sequences 1 and 2 under the requirements listed in the same table.

Figure 11A:
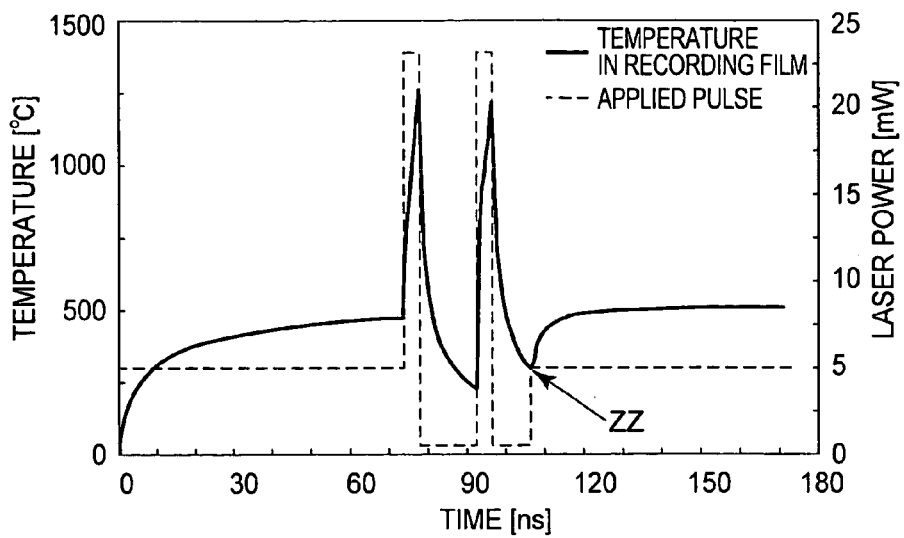
FIGS. 11A to 11C are illustrations of simulation in comparison of temperature rise under application the recording pulse sequences 1 and 2.
Figure 11B:
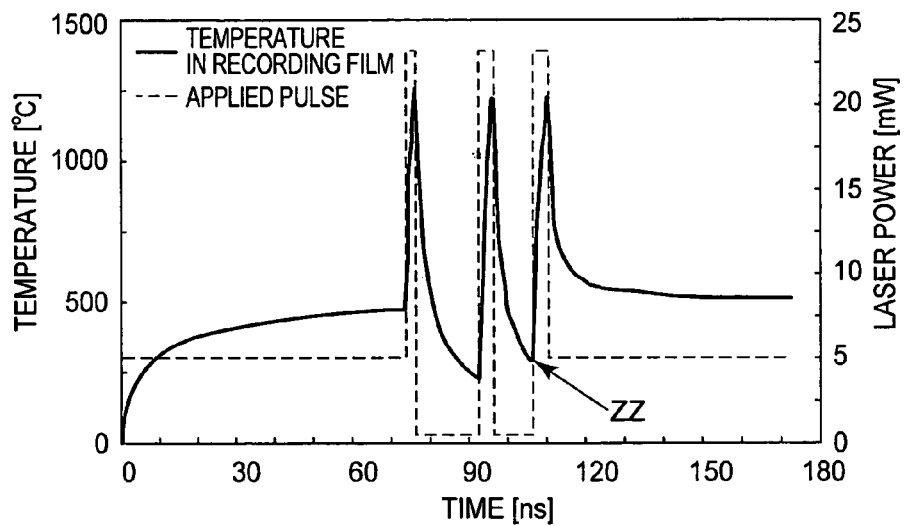
Figure 11C:
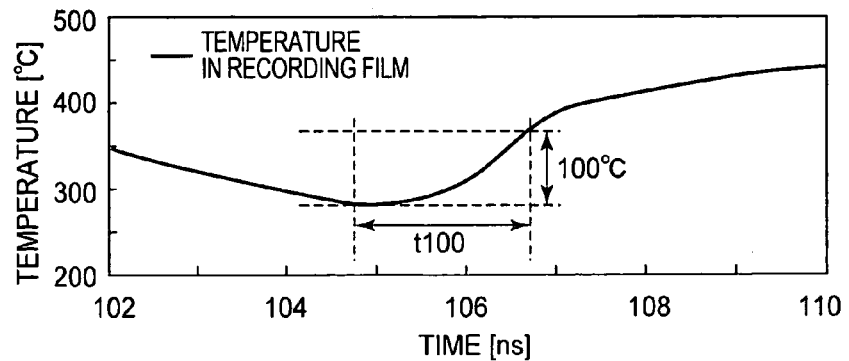

The simulation results are shown in FIGS. 11A to 11C. The results shown in FIGS. 11A and 11B were given with the recording pulse sequences 1 and 2, respectively. In FIGS. 11A and 11B, dot and solid lines indicate applied laser pulses and the temperature change in the recording film 103 when the laser pulses were applied, respectively. The axis of abscissa in FIGS. 11A and 11B indicates an elapsed time for the recording pulse sequences 1 and 2, respectively, when a laser beam is scanning. The axis of ordinate in FIGS. 11A and 11B indicates a temperature of the recording film 103 and an applied power of the laser pulses.

Also shown in FIG. 11C is the temperature change in the phase-change recording film 103, at a section ZZ shown in FIGS. 11A and 11B, just after the cooling pulse Tcl was applied in each of the recording pulse sequences 1 and 2.

A reference sign t100 in FIG. 11C is a duration of temperature change in the recording film 103 to rise by 100° C. under application of the recording pulse sequence 1 or 2. The temperature change was simulated from zero nanoseconds that was a moment at which the erasing power Pe was applied after ascent from the bottom power Pb when the pulse sequence 1 was applied to the recording film 103. It was also simulated based on zero nanoseconds that was a moment at which the erasing top power Pet was applied after ascent from the bottom power Pb when the pulse sequence 2 was applied to the recording film 103. In other words, the FIG. 11C represents the two cases under application of the recording pulse sequences 1 and 2.

The duration t100 was 1.85 nanoseconds under application of the recording pulse sequence 1 whereas 0.83 nanoseconds under the sequence 2. It was found that the temperature of the recording film 103 rises steeper, under application of the recording pulse sequence 2, by application of the erasing top power pulse Tet just after the cooling pulse Tcl, than under the sequence 1. This shows that temperature change in the recording film 103 depends on laser pulses.

Simulation for a single-layer optical storage medium under application of the recording pulse sequence 1, for which excellent recording characteristics was confirmed beforehand, gave the duration t100 about 1 nanoseconds.

It is thus found that the recording pulse sequence 2 with the duration t100 of 0.83 nanoseconds (shorter than 1 ns.) is the better choice for the highly transparent data layer D0.

Produced next were sample optical storage media D that exhibited the light transmissivity Tr of 30% and 70%, respectively, each with the highly transparent data layer D0 having the protective film 102, the recording film 103, the protective film 104, and the reflective film 105, according to the requirements shown in FIG. 10.

Simulation for the duration t100 in the same way as discussed above showed results similar to that at the light transmissivity Tr of 50%.

Figures 12, 13:
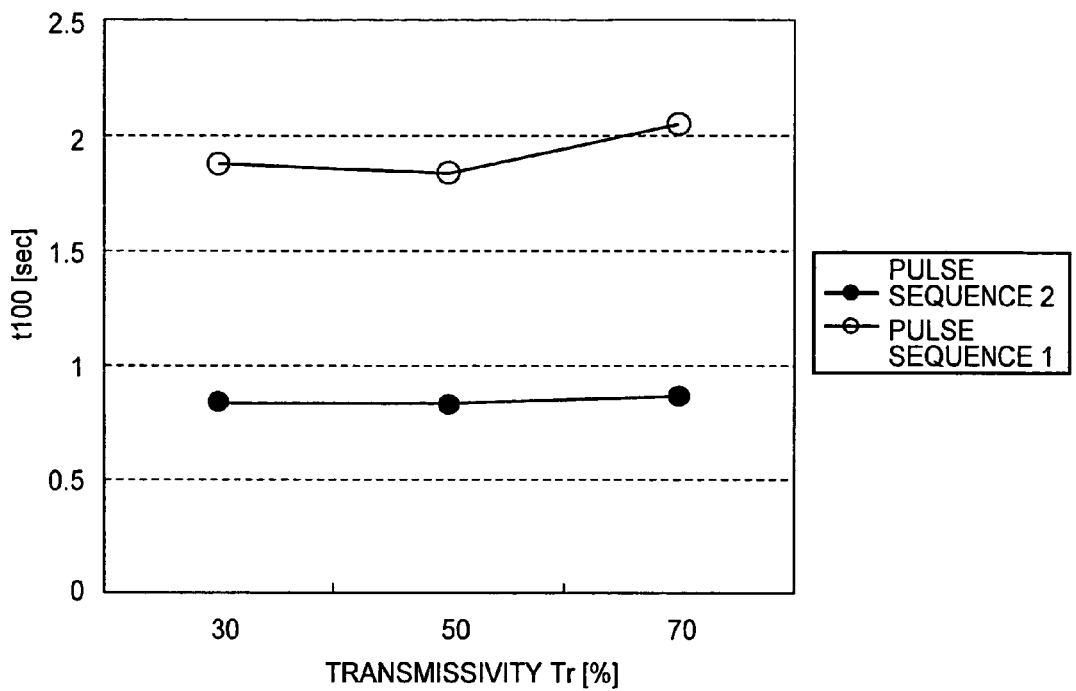
FIG. 12 is an illustration of simulation results in the duration of temperature change in a recording film to rise by 100° C. at light transmissivity Tr of 30%, 50% and 70% under application of the recording pulse sequences 1 and 2.
FIG. 13 is a table showing measured initial and overwrite recording characteristics for an embodiment sample 1 and a comparative sample 1 of the embodiment of an optical storage medium according to the present invention.

FIG. 12 shows simulation results for the duration t100 at the light transmissivity Tr of 30%, 50% and 70% under application of the recording pulse sequences 1 and 2.

It was found that the sample highly transparent data layers D0 exhibited the duration t100 shorter than 1 nanoseconds at the light transmissivity Tr of 30%, 50% and 70% under application of the recording pulse sequence 2. The results teach that the recording pulse sequence 2 is a better choice for the highly transparent data layer D0.

The recording pulse sequence 2 in which the erasing top pulse Tet is applied just after the cooling pulse Tcl gives steeper temperature rise in the recording film 103. Such steeper temperature rise results in recrystallization of an after-mark portion usually formed at the end of a recorded mark, which offers stable recorded-mark formation at a given mark length for better jitter characteristics. The after-mark portion is an amorphous portion that is inevitably formed at the end of a recorded mark having a desired mark length.

Laser-beam absorption in recoding and reflective films depends on each film thickness. Known single-layer optical media having thick-enough recoding and reflective films absorbs a laser beam sufficiently, and hence available to reversible change between recording and reproduction, due to heat developed by the laser beam.

In the same way, the furthest data layer D1 of the optical storage medium D having the thick recoding and reflective films, like the known media, exhibits excellent recording and overwrite characteristics under application of the recording pulse sequence 1.

In contrast, it is one requirement for the highly transparent data layer D0 of the optical storage medium D to have thin recoding and reflective films. Thus, the data layer D0 suffers less thermal change required for the reversible change due to insufficient laser-beam absorption under application of the recording pulse sequence 1. This results in insufficient recording, erasure and overwrite characteristics as confirmed by the inventor of the present invention.

Therefore, it is required to record the furthest data layer and the highly transparent data layer(s) that exhibit different light transmissivities Tr, according to recording requirements optimum to each data layer for excellent recording and overwrite characteristics in phase-change optical storage media having a plurality of data layers.

[Evaluation of Erasure Rate]

The inventor of the present invention also evaluated an erasure rate to experimentally examine effects of the erasing top pulse Tet.

The evaluation was made for the highly transparent data layer D0 of the optical storage medium D as follows: Measured first was C/N for a 14T-signal recorded in an un-recorded recording area 24 (FIG. 3). The 14T-signal consists of 14T-marks (the longest mark in DVD-R and RW) with 14T-spaces each between successive two 14T-marks. Measured next was C/N again for the 14T-signal with a 3T-signal overwritten thereon. The 3T-signal consists of 3T-marks (the shortest mark in DVD-R and RW) with 3T-spaces each between successive two 3T-marks.

Decrease in C/N for the 14T-signal before and after the 3T-signal overwriting was evaluated as the erasure rate. Evaluation at DVD×1 speed showed about 30 dB in erasure rate under application of the recording pulse sequence 2 with the erasing top pulse Tet, about 7 dB higher than under the recording pulse sequence 1. This level is acceptable as similar to the single-layer optical storage media under application of the recording pulse sequence 1.

Erasure of recorded marks is done by irradiating a recording film with a laser beam to heat the film to a temperature over the crystallization temperature, followed by slow cooling.

The erasing power Pe in the recording pulse sequence 1 (FIG. 1) can heat a recording film to a temperature over the crystallization temperature. Nevertheless, a thinner recording film, for example, in the highly transparent data layer D0 suffers from lower laser-beam absorption. This leads to longer duration for reaching the crystallization temperature by application of the erasing power Pe after the bottom power Pb carried by the cooling pulse Tcl that follows the recording pulses Ttop and Tmp in the recording pulse sequence 1. Slower temperature rise in a recording film by the erasing power Pe causes out-of timing for stating crystallization at the end of each recorded mark, with variation in the crystallization temperature among recording-film materials. This leads to indistinct recorded mark end edges in which a former recoded mark is left at a portion which should be crystallized by overwriting, etc., which results in unacceptable initial recording and overwrite jitter characteristics.

In contrast, a thicker recording film, for example, in the furthest data layer D1, enjoys steeper temperature rise due to sufficient thermal absorption after application of the erasing power Pe, thus less suffering from indistinct recorded mark end edges in which a former recoded mark is left after overwriting, etc.

The foregoing discussion led to an idea in which steeper temperature rise in a recording film after application of the cooling pulse Tcl could offer excellent recording characteristics.

Also experimentally found was that a comparatively high erasing power Pe to the highly transparent data layer D0 causes steep temperature rise in the recording film with continuous increase due to small heat capacity of the recording and reflective films, which could damage the recording film when the film suffers a high temperature beyond the melting point over a long period of time.

Under the findings, the inventor of the present invention found a possible solution to the problem discussed above. The solution is applying the erasing top power Pet, higher than the erasing power Pe but still relatively low power, just after the cooling pulse Tcl in the recording pulse sequence to the highly transparent data layer D0. This inevitably causes steep temperature rise in the recording film but can maintain the temperature in between the crystallization temperature and the melting point with such a relatively low power.

The temperature simulation and actual measurements of erasure rate revealed that steep temperature rise in a recording film just after application of the cooling pulse Tcl is one requirement for multi-layered optical storage media for excellent recording and overwrite characteristics, which depends on recording-film thickness and laser pulses.

The findings teach that the recording pulse sequence having the erasing top pulse Tet is effective for steep temperature rise in the thin recording film 103, of the highly transparent data layer D0, which exhibits low laser-beam absorption.

Also taught is different recording pulse sequences in which one has the erasing top pulse Tet but the other not are effective for multi-layered optical storage media, such as, the optical storage medium D having the furthest data layer D1 and the highly transparent data layer D0 with different thicknesses in the recording films.

[Study of Erasing Top Pulse]

The inventor of the present invention presupposed that the erasing top pulse Tet could affect recording and overwrite characteristics of the optical storage medium D, and found out that the presumption is correct and there is an optimum erasing top pulse Tet that gives excellent recording and overwrite characteristics, based on the following embodiment sample 1 and comparative sample 1.

The embodiment sample 1 and the comparative sample 1 were subjected to recording (1-beam overwriting) with an optical-disc drive tester (DDU1000) equipped with a 658 nm-wavelength laser diode and an optical lens (NA=0.65) made by Pulstec. Co. Focusing was made onto each of the recording films 103 and 108 of the highly transparent data layer D0 and the furthest data layer D1, respectively for evaluation.

Recording was evaluated with an 8-16 modulation random sequence at 7.7 m/s in recording linear velocity (corresponding to dual-layer DVD-Video standard 2× speed). The unit clock T was 19.2 ns (corresponding to DVD 1× speed). The bit length was 0.293 μm/bit. Recording was conducted in the same density as DVD-Video, with the capacity corresponding to 8.5 gigabytes for the dual layers. Recording of 10-time overwriting were conducted to a target track and adjacent tracks, followed by slicing at the amplitude center of each reproduced signal for measurements of clock to data jitters.

The reproducing power Pr was constant at 1.4 mW. The recording pulse sequence 2 shown in FIG. 4 was used as the recording strategy.

Embodiment Sample 1

The first substrate 101 was made of a polycarbonate resin with 120 mm in diameter and 0.6 mm in thickness. Grooves were formed on the substrate 101 at 0.74 μm in track pitch, with 25 nm in groove depth and about 40:60 in width ratio of groove to land.

After a vacuum chamber was exhausted up to $3 \times 10^{-4}$ Pa, a 70 nm-thick first protective film 102 was formed on the first substrate 101 by high-frequency magnetron sputtering with a target of ZnS added with 20-mol % $SiO_2$ at $2 \times 10^{-1}$ Pa in Ar-gas atmosphere.

Formed on the first protective film layer 102, in order, were a 5 nm-thick first recording film 103 with a target of an alloy of 4 elements Ge—In—Sb—Te, a 9 nm-thick second protective film 104 of the same material as the first protective film 102, a 5 nm-thick first reflective film 105 with a target of an Ag alloy, and a 60 nm-thick optical adjustment film 106 of the same material as the film 102.

The first substrate 101 was taken out from the vacuum chamber. The optical adjustment film 106 was spin-coated with an acrylic UV-curable resin (SK5110 made by Sony Chemicals. Co.). The resin was cured with radiation of UV rays so that a 3 μm-thick third protective film 112 was formed on the film 106.

Accordingly, the first protective film 102, the first recording film 103, the second protective film 104, the first reflective film 105, the optical adjustment film 106, and the third protective film 112, formed on the first substrate 101 constitute the highly transparent data layer D0.

Formed on the second substrate 111, in order, in the same method as disclosed above, were a 120 nm-thick second reflective film 110 with a target of an Ag alloy, a 16 nm-thick fourth protective film 109 of the same material as the first protective film 102, a 16 nm-thick second recording film 108 with a target of an alloy of 4 elements Ge—In—Sb—Te, and a 70 nm-thick fifth protective film 107.

The second substrate 111 was taken out from the vacuum chamber. The fifth protective film 107 was spin-coated with an acrylic UV-curable resin (SK5110 made by Sony Chemicals. Co.). The resin was cured with radiation of UV rays so that a 3 μm-thick sixth protective film 113 was formed on the film 107.

Accordingly, the fifth protective film 107, the second recording film 108, the fourth protective film 109, the second reflective film 110, and the sixth protective film 113, formed on the second substrate 111 constitute the furthest data layer D1.

The highly transparent data layer D0 and the furthest data layer D1 were initialized by an initialization apparatus (PWP120 made by Hitachi Computer Peripherals, Co.). After initialization, the data layers D0 and D1 are bonded to each other with the double-sided adhesive sheet 114 so that the first substrate 101 and the second substrate 111 are placed outermost, thus a sample dual-layer optical storage medium D being produced.

The light transmissivities Tr after initialized were about 50% and 0% for the highly transparent data layer D0 and the furthest data layer D1, respectively. Measurements of the light transmissivity Tr were made using a Spectrophotometer 330 made by Hitachi Computer Peripherals, Co. at 658 nm in laser wavelength.

A recording laser beam was focused onto the first recording film 103 of the highly transparent data layer D0 exhibiting higher transmissivity Tr to evaluate jitter characteristics at 7.7 m/s in recording linear velocity. Recording was conducted to a target track and adjacent tracks, and a middle track level was used in evaluation.

Evaluation was made with the recording pulse sequence 2 that is a 1T-multipulse sequence with the erasing top pulse Tet, as shown in FIG. 4. Recording parameters were: recording power Pw=23.1 [mW], erasing power Pe=4.8 [mW], bottom power Pb=0.5 [mW], with top pulse Ttop=0.17 [T], multipulse Tmp=0.23 [T], and cooling pulse Tcl=0.53 [T]. Erasing top pulse parameters were: erasing top power Pet=23.1 [mW], and erasing top pulse Tet=0.18 [T].

The measured initial and overwrite recording characteristics are shown in FIG. 13 for the embodiment sample 1 and also the comparative sample 1 (which will be discussed later).

The embodiment sample 1 exhibited: 7.2% in initial-recording (DOW0) jitter, 9.2% in 1th-overwrite (DOW1) jitter, 8.5% in 9th-overwrite (DOW9) jitter, and 9.2% in 999th-overwrite (DOW999) jitter, with excellent recording and overwrite characteristics.

In the disclosure, overwriting is 1-beam overwriting for erasing a recorded mark already formed and forming a new recorded mark with one-time laser scanning. Also defined in the disclosure are: DOW0 (Direct Over Write, referred to as overwriting in the disclosure); initial recording for forming a recorded mark on an un-recorded section of an initialized optical storage medium D; and DOW1; 1-th overwriting for forming another recorded mark on the initially recorded section. Jitter of 12% or less has been accepted as giving less adverse effects to error rate. Thus, defined further in the disclosure is: "excellent" in jitter of 12% or less over from DOW0 to DOW999 jitter (from initial- to 999th-overwriting).

Next, a recording laser beam was focused onto the second recording film 108 of the furthest data layer D1 exhibiting lower transmissivity Tr to evaluate jitter characteristics at the same recording linear velocity as the highly transparent data layer D0. Recording was conducted to a target track and adjacent tracks, and a middle track level was used in evaluation.

Figure 1:
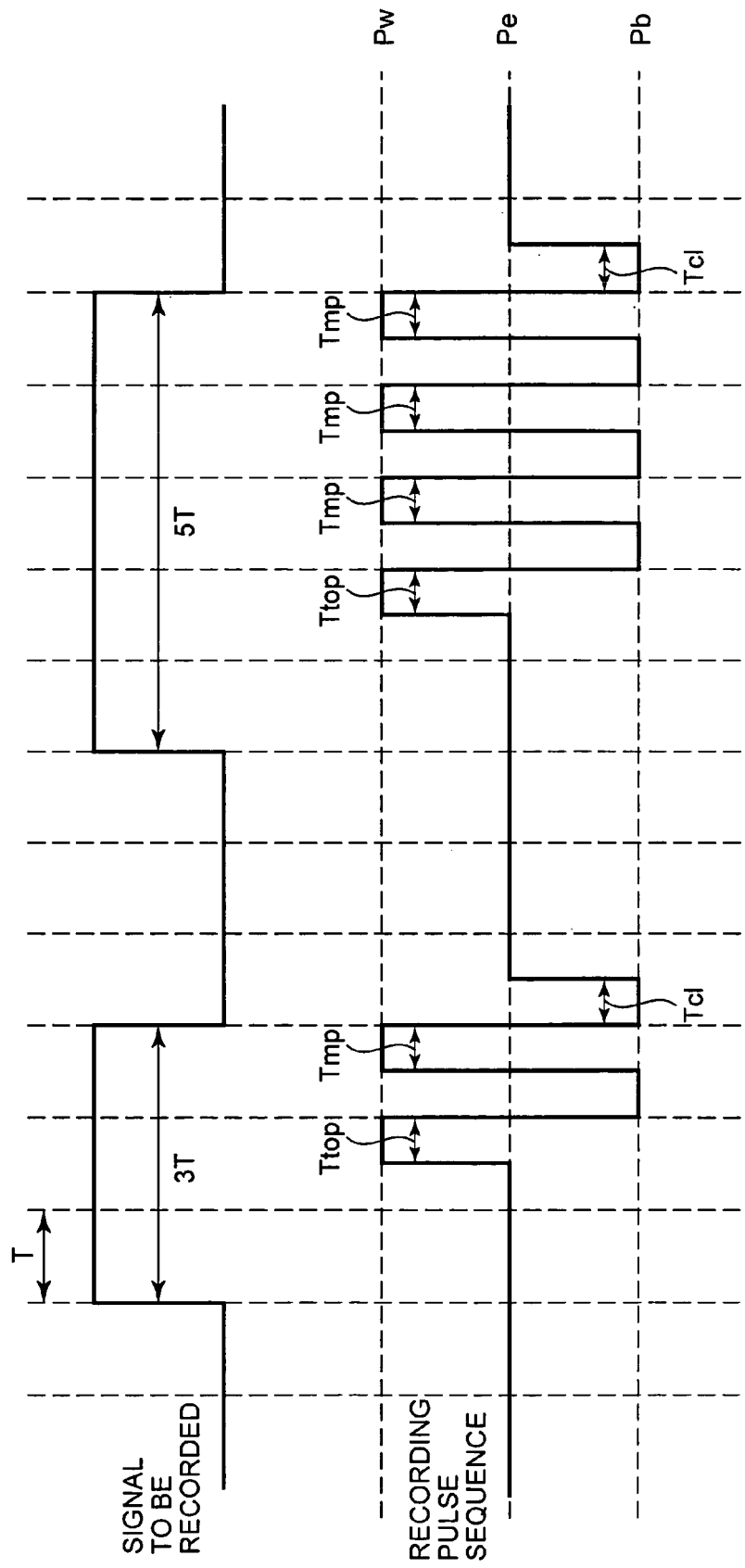
FIG. 1 is a view illustrating a known recording pulse sequence 1.

Evaluation was made with the recording pulse sequence 1 that is a 1T-multipulse sequence, as shown in FIG. 1. Recording parameters were: recording power Pw=35.0 [mW], erasing power Pe=13.0 [mW], bottom power Pb=0.5 [mW], with Ttop=0.40 [T], Tmp=0.30 [T], and Tcl=0.40 [T].

Figures 14, 15:
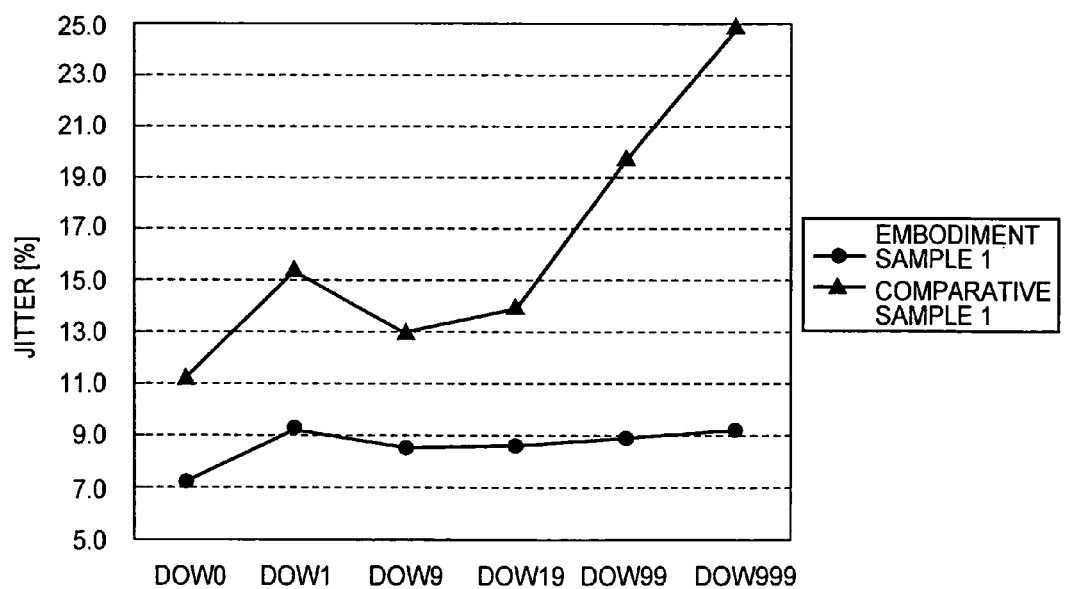
FIG. 14 is a table showing measured initial and overwrite characteristics for the embodiment and the comparative samples 1.
FIG. 15 is a view showing jitter curves with respect to the number of DOW for the embodiment and comparative samples 1.

The measured initial and overwrite characteristics are shown in FIG. 14 for the embodiment sample 1 and also the comparative sample 1 (which will be discussed later).

The embodiment sample 1 exhibited: 6.8% in DOW0 jitter, 8.1% in DOW1 jitter, 7.6% in DOW9 jitter, and 9.1% in DOW999 jitter, with excellent recording and overwrite characteristics.

Comparative Sample 1

Measurements were made for the highly transparent data layer D0 of a comparative sample optical storage medium D produced in the same way as the embodiment sample 1, according to the same requirements as for the counterpart D0 in the embodiment sample 1, except employment of the recording pulse sequence 1 with no erasing top pulse Tet.

As shown in FIG. 13, the comparative sample 1 exhibited: 11.3% in DOW0 jitter, excellent, whereas 15.4% in DOW1 jitter, 13.0% in DOW9 jitter, and 25.0% in DOW999 jitter, unacceptable.

Moreover, measurements were made for the furthest data layer D1 of the comparative sample optical storage medium D, according to the same requirements as for the counterpart D1 in the embodiment sample 1, except employment of the recording pulse sequence 2 with the erasing top pulse Tet.

As shown in FIG. 14, the comparative sample 1 exhibited: 7.8% in DOW0 jitter, 9.2% in DOW1 jitter, 8.3% in DOW9 jitter, and 10.3% in DOW999 jitter, all below 12%, thus excellent recording and overwrite characteristics, but still worse than the embodiment sample 1.

Shown in FIG. 15 are DOW-jitter curves for the highly transparent data layer D0 in the embodiment and comparative samples 1, based on the measurements shown in FIG. 13.

FIG. 15 teaches that there is a big difference in recording characteristics between the embodiment and comparative samples 1 for the highly transparent data layer D0 having higher light transmissivity Tr, which depends on whether not the recording pulse sequence has the erasing top pulse Tet. One possible reason for such a big difference is that application of the erasing top pulse Tet after the cooling pulse Tcl in the recording pulse sequence 2 caused temperature steep rise in the recording film 103 to a cooling temperature, thus giving the excellent recording characteristics and also multi-overwrite characteristics.

Regarding the furthest data layer D1, as shown in FIG. 14, both embodiment and comparative samples 1 exhibited excellent recording characteristics, irrespective of usage of the erasing top pulse Tet. Nevertheless, the embodiment sample 1 exhibited further excellent recording characteristics under application of the recording pulse sequence 1 with no erasing top pulse Tet being used.

The foregoing discussion leads to the following conclusion: The recording pulse sequence 2 with the erasing top pulse Tet gives excellent recording characteristics to any data layer irrespective of light transmissivity Tr. In contrast, the recording pulse sequence 1 with no erasing top pulse Tet gives further excellent recording characteristics to a specific data layer, such as the furthest data layer D1, having lower light transmissivity Tr. It is thus preferable to use a recording pulse sequence optimum to each data layer in phase-change optical storage media having a plurality of data layers.

[Study of Power Ratio Pet/Pw]

The inventor of the present invention presupposed that there is a correlation between the erasing top power Pet for applying the erasing top pulse Tet and the recording power Pw, and found out that the presumption is correct and there is a preferable range for a power ratio Pet/Pw between the erasing top power Pet and the recording power Pw, based on the following embodiment samples 2 to 16 and comparative samples 2 to 6.

Embodiment Samples 2 to 6

Measurements were made for embodiment sample optical storage media D produced in the same way as the embodiment sample 1, according to the same requirements as for the embodiment sample 1 (Pe=4.8 mW), except change in the erasing top power Pet, one of the parameters in the recording pulse sequence 2.

The recording requirements and measured DOW-jitter levels are shown in FIG. 16 for the embodiment samples 2 to 6 and also the comparative samples 2 and 3 (which will be discussed later).

The parameter Pet was varied as follows: 23.1 mW (Pet/Pw=1.0), 34.7 mW (Pet/Pw=1.5), 41.6 mW (Pet/Pw=1.8), 16.2 mW (Pet/Pw=0.7), and 9.2 mW (Pet/Pw=0.4) for the embodiment samples 2 to 6, respectively.

Evaluation of the embodiment samples 2 to 6 in the same way as the embodiment sample 1 showed jitter level below 12% over from the initial recording (DOW0) to the 1000th-recording (DOW999), thus excellent recording and overwrite characteristics, like the embodiment sample 1.

Comparative Samples 2 and 3

Measurements were made for comparative sample optical storage media D produced in the same way as the embodiment sample 1, according to the same requirements as for the embodiment sample 1, except change in the erasing top power Pet: 46.2 mW (Pet/Pw=2.0) and 6.9 mW (Pet/Pw=0.3) for the comparative samples 2 and 3, respectively, in the recording pulse sequence 2.

As shown in FIG. 16, evaluation of the comparative samples 2 and 3 in the same way as the embodiment samples 2 to 6 showed excellent in jitter level in the initial recording ((DOW0), whereas over 12% from the 2nd-recording (DOW1) to the 1000th-recording (DOW999), thus unacceptable recording and overwrite characteristics, compared to the embodiment samples 1 to 6.

Embodiment Samples 7 to 11

Examined in the embodiment samples 7 to 11 was how light transmissivity Tr affects the power ratio Pet/Pw.

Embodiment sample optical storage media D were produced in the same way as the embodiment sample 1, except for film thickness: 7 nm and 8.5 nm for the first recording film 103 and the first reflective film 105, respectively, in the highly transparent data layer D0.

The laser powers were adjusted to: 20.0 [mW], 4.4 [mW] and 0.5 [mW] for the recording power Pw, erasing power Pe, and bottom power Pb, respectively. This is because the highly transparent data layer D0 having the 7 nm-thick first recording film 103 and the 8.5 nm-thick first reflective film 105 exhibited light transmissivity Tr of 30%.

Moreover, the erasing top power Pet was varied among the embodiment samples 7 to 11, with the same requirements as discussed above for the other recording parameters.

The recording requirements and measured DOW-jitter levels are shown in FIG. 17 for the embodiment samples 7 to 11 and also the comparative samples 4 and 5 (which will be discussed later).

The erasing top power Pet was varied as follows: 16.0 mW (Pet/Pw=0.8), 24.0 mW (Pet/Pw=1.2), 30.0 mW (Pet/Pw=1.5), 10.0 mW (Pet/Pw=0.5), and 8.0 mW (Pet/Pw=0.4) for the embodiment samples 7 to 11, respectively.

Evaluation of the embodiment samples 7 to 11 in the same way as the embodiment sample 1 showed jitter level below 12% over from DOW0 to DOW999, thus excellent recording and overwrite characteristics, like the embodiment sample 1.

Comparative Samples 4 and 5

Measurements were made in the same way as the embodiment samples 7 to 11, except change in the erasing top power Pet: 36.0 mW (Pet/Pw=1.8) and 6.0 mW (Pet/Pw=0.3) for the comparative samples 4 and 5, respectively.

As shown in FIG. 17, evaluation of the comparative samples 4 and 5 in the same way as the embodiment samples 7 to 11 showed jitter levels over 12% in DOW999, thus unacceptable overwrite characteristics, compared to the embodiment samples 1 and 7 to 11.

Embodiment Samples 12 to 16

Examined in the embodiment samples 12 to 16 was also how light transmissivity Tr affects the power ratio Pet/Pw.

Embodiment sample optical storage media D were produced in the same way as the embodiment sample 1, except for the thickness of 2 nm for both of the first recording film 103 and the first reflective film 105 in the highly transparent data layer D0.

The laser powers were adjusted to: 32.0 [mW], 6.5 [mW] and 0.5 [mW] for the recording power Pw, erasing power Pe, and bottom power Pb, respectively. This is because the highly transparent data layer D0 having the 2 nm-thick first recording and reflective films 103 and 105 exhibited light transmissivity Tr of 70%.

Moreover, the erasing top power Pet was varied among the embodiment samples 12 to 16, with the same requirements as discussed above for the other recording parameters.

The recording requirements and measured DOW-jitter levels are shown in FIG. 18 for the embodiment samples 12 to 16 and also the comparative sample 6 (which will be discussed later).

The erasing top power Pet was varied as follows: 38.0 mW (Pet/Pw=1.2), 51.2 mW (Pet/Pw=1.6), 60.0 mW (Pet/Pw=1.9), 22.4 mW (Pet/Pw=0.7), and 12.8 mW (Pet/Pw=0.4) for the embodiment samples 12 to 16, respectively.

Evaluation of the embodiment samples 12 to 16 in the same way as the embodiment sample 1 showed jitter level below 12% over from DOW0 to DOW999, thus excellent recording and overwrite characteristics, like the embodiment sample 1.

Comparative Sample 6

Measurements were made in the same way as the embodiment samples 12 to 16, except change in the erasing top power Pet to 9.6 mW (Pet/Pw=0.3).

As shown in FIG. 18, evaluation of the comparative sample 6 in the same way as the embodiment samples 12 to 16 showed jitter levels over 12% in DOW1 and DOW999, thus unacceptable overwrite characteristics, compared to the embodiment samples 1 and 12 to 16.

Examined in the embodiment samples 2 to 16 and the comparative samples 2 to 6 was a preferable range for a power ratio Pet/Pw between the erasing top power Pet and the recording power Pw, at 30%, 50% and 70% in light transmissivity Tr for the highly transparent data layer D0.

Figure 19:
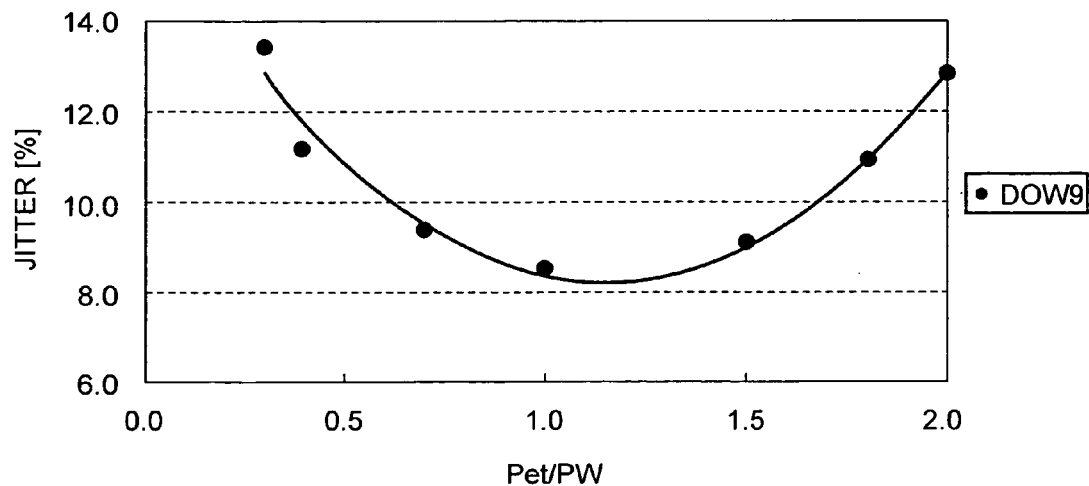
FIG. 19 is a view showing jitter versus power ratio Pet/Pw at light transmissivity of 50%.
Figure 20:
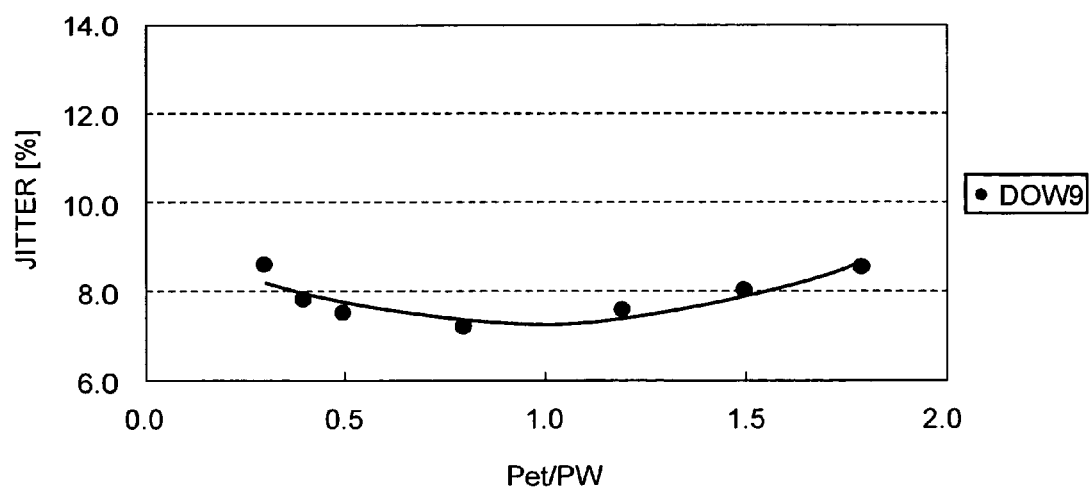
FIG. 20 is a view showing jitter versus power ratio Pet/Pw at light transmissivity of 30%.
Figures 21, 22, 23:
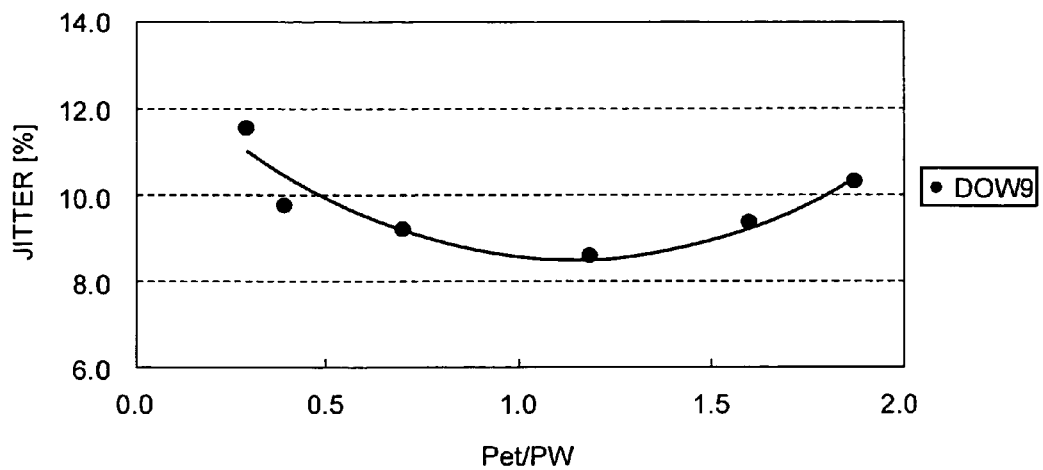
FIG. 21 is a view showing jitter versus power ratio Pet/Pw at light transmissivity of 70%.
FIG. 22 is a table showing recording requirements and measured DOW-jitter levels for embodiment samples 17 to 21 and comparative samples 7 and 8 of the embodiment of an optical storage medium according to the present invention.
FIG. 23 is a table showing recording requirements and measured DOW-jitter levels for embodiment samples 22 to 26 and comparative samples 9 and 10 of the embodiment of an optical storage medium according to the present invention.

Shown in FIGS. 19 to 21 is DOW9-jitter versus power ratio Pet/Pw of the recording pulse sequence applied to the highly transparent data layer D0 at 50%, 30% and 70% in light transmissivity Tr, respectively, based on the measurements shown in FIGS. 16 to 18.

A range of the power ratio Pet/Pw that gives a jitter level lower than 12% that is thought to give less effects to the error rate in DOW9 in each of FIGS. 19 to 21 is as follows: 0.4 to 1.8 at 50% in light transmissivity Tr in FIG. 19; 0.4 to 1.5 at 30% in light transmissivity Tr in FIG. 20; and 0.4 and over at 70% in light transmissivity Tr in FIG. 21.

In other words:
30% in transmissivity Tr: $0.4 \leq Pet/Pw \leq 1.5$
50% in transmissivity Tr: $0.4 \leq Pet/Pw \leq 1.8$, and
70% in transmissivity Tr: $0.4 \leq Pet/Pw$ It is thus revealed that $0.4 \leq Pet/Pw \leq 1.5$ is a preferable range for the power ratio Pet/Pw at any of the light transmissivities Tr for the highly transparent data layer D0.

A further preferable upper limit for jitter level is 10% under consideration of adverse effects on reproduction compatibility over different types and performances of commercially available recording apparatus.

A range of the power ratio Pet/Pw that gives such a jitter level of 10% or lower in each of FIGS. 19 to 21 is as follows:

30% in transmissivity Tr: $0.5 \leq Pet/Pw \leq 1.2$

50% in transmissivity Tr: $0.7 \leq Pet/Pw \leq 1.5$, and

70% in transmissivity Tr: $0.7 \leq Pet/Pw \leq 1.6$

It is thus concluded that a further preferable power ratio Pet/Pw is $0.7 \leq Pet/Pw \leq 1.2$.

[Study of Pulse Width Ratio Tet/Tmp]

The inventor of the present invention presupposed that there is a a preferable range for a pulse width ratio Tet/Tmp between a width of the erasing top pulse Tet (a 1-pulse applying time for the pulse Tet) and a width of the multipulse Tmp (a 1-pulse applying time for the pulse Tmp), and found out that the presumption is correct and there is a preferable range for a pulse width ratio Tet/Tmp between the erasing top pulse width and the multipulse width, that offers excellent recording and overwrite characteristics, based on the following embodiment samples 17 to 31 and comparative samples 7 to 12.

Embodiment Samples 17 to 21

Measurements were made for embodiment sample optical storage media D produced in the same way as the embodiment sample 1, according to the same requirements as for the embodiment sample 1, except change in the erasing top pulse width, one of the parameters in the recording pulse sequence 2.

The recording requirements and measured DOW-jitter levels are shown in FIG. 22 for the embodiment samples 17 to 21 and also the comparative samples 7 and 8 (which will be discussed later). In FIG. 22 and the following disclosure, the reference signs Tet and Tmp indicate an erasing top pulse width and a multipulse width, respectively, or an erasing top pulse and a multipulse themselves, depending on the discussion. In FIG. 22, the multipulse width Tmp is constant at 0.23T.

The parameter Tet was varied as follows: 0.18T (Tet/Tmp=0.8), 0.23T (Tet/Tmp=1.0), 0.30T (Tet/Tmp=1.3), 0.12T (Tet/Tmp=0.5), and 0.07T (Tet/Tmp=0.3) for the embodiment samples 17 to 21, respectively.

Evaluation of the embodiment samples 17 to 21 in the same way as the embodiment sample 1 showed jitter level below 12% over from DOW0 to DOW999, thus excellent recording and overwrite characteristics, like the embodiment sample 1.

Comparative Samples 7 and 8

Measurements were made in the same way as the embodiment sample 1, except change in the erasing top pulse width Tet: 0.35T (Tet/Tmp=1.5) and 0.02T (Tet/Tmp=0.1) for the comparative samples 7 and 8, respectively.

As shown in FIG. 22, evaluation of the comparative samples 7 and 8 in the same way as the embodiment samples 17 to 21 showed excellent in jitter level in DOW0, whereas over 12% from DOW1 to DOW999, thus unacceptable recording and overwrite characteristics, compared to the embodiment samples 1 and 17 to 21.

Embodiment Samples 22 to 26

Examined in the embodiment samples 22 to 26 was how light transmissivity Tr affects the pulse width ratio Tet/Tmp.

Embodiment sample optical storage media D were produced in the same way as the embodiment sample 1, except for the thickness of 7 nm for the first recording film 103 and 8.5 nm for the first reflective film 105 in the highly transparent data layer D0.

The laser powers were adjusted to: 20.0 [mW], 4.4 [mW] and 0.5 [mW] for the recording power Pw, erasing power Pe, and bottom power Pb, respectively. This is because the highly transparent data layer D0 having the 7 nm-thick first recording film 103 and 8.5 nm-thick first reflective film 105 exhibited light transmissivity Tr of 30%.

Moreover, the erasing top pulse width Tet was varied among the embodiment samples 22 to 26, with the same requirements as discussed above for the other recording parameters.

The recording requirements and measured DOW-jitter levels are shown in FIG. 23 for the embodiment samples 22 to 26 and also the comparative samples 9 and 10 (which will be discussed later).

The erasing top pulse width Tet was varied as follows: 0.16T (Tet/Tmp=0.7), 0.23T (Tet/Tmp=1.0), 0.28T (Tet/Tmp=1.2), 0.09T (Tet/Tmp=0.4), and 0.05T (Tet/Tmp=0.2) for the embodiment samples 22 to 26, respectively.

Evaluation of the embodiment samples 22 to 26 in the same way as the embodiment sample 1 showed jitter level below 12% over from DOW0 to DOW999, thus excellent recording and overwrite characteristics, like the embodiment sample 1.

Comparative Samples 9 and 10

Measurements were made in the same way as the embodiment samples 22 to 26, except change in the erasing top pulse width Tet to 0.32T (Tet/Tmp=1.4) and 0.02T (Tet/Tmp=0.1) for the comparative samples 9 and 10, respectively.

As shown in FIG. 23, evaluation of the comparative samples 9 and 10 in the same way as the embodiment samples 22 to 26 showed jitter levels over 12% in DOW999, thus unacceptable overwrite characteristics, compared to the embodiment samples 1 and 22 to 26.

Embodiment Samples 27 to 31

Examined in the embodiment samples 27 to 31 was also how light transmissivity Tr affects the pulse width ratio Tet/Tmp.

Embodiment sample optical storage media D were produced in the same way as the embodiment sample 1, except for the thickness of 2 nm for the first recording and reflective films 103 and 105 in the highly transparent data layer D0.

The laser powers were adjusted to: 32.0 [mW], 6.5 [mW] and 0.5 [mW] for the recording power Pw, erasing power Pe, and bottom power Pb, respectively. This is because the highly transparent data layer D0 having the 2 nm-thick first recording and reflective films 103 and 105 exhibited light transmissivity Tr of 70%.

Moreover, the erasing top pulse width Tet was varied among the embodiment samples 27 to 31, with the same requirements as discussed above for the other recording parameters.

Figures 24, 25:
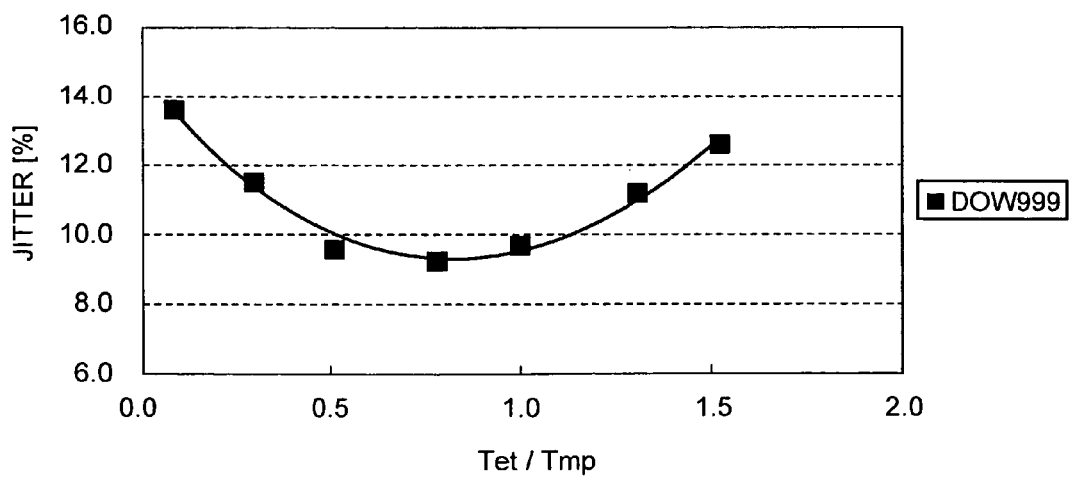
FIG. 24 is a table showing recording requirements and measured DOW-jitter levels for embodiment samples 27 to 31 and comparative samples 11 and 12 of the embodiment of an optical storage medium according to the present invention.
FIG. 25 is a view showing jitter versus pulse width ratio Tet/Tmp at light transmissivity of 50%.

The recording requirements and measured DOW-jitter levels are shown in FIG. 24 for the embodiment samples 27 to 31 and also the comparative samples 11 and 12 (which will be discussed later).

The erasing top pulse width Tet was varied as follows: 0.21T (Tet/Tmp=0.9), 0.28T (Tet/Tmp=1.2), 0.35T (Tet/Tmp=1.5), 0.14T (Tet/Tmp=0.6), and 0.09T (Tet/Tmp=0.4) for the embodiment samples 27 to 31, respectively.

Evaluation of the embodiment samples 27 to 31 in the same way as the embodiment sample 1 showed jitter level below 12% over from DOW0 to DOW999, thus excellent recording and overwrite characteristics, like the embodiment sample 1.

Comparative Samples 11 and 12

Measurements were made in the same way as the embodiment samples 27 to 31, except change in the erasing top pulse Tet to 0.39T (Tet/Tmp=1.7) and 0.05T (Tet/Tmp=0.2) for the comparative samples 11 and 12, respectively.

As shown in FIG. 24, evaluation of the comparative samples 11 and 12 in the same way as the embodiment samples 27 to 31 showed jitter levels over 12% from DOW1 to DOW999, thus unacceptable overwrite characteristics, compared to the embodiment samples 1 and 27 to 31.

Examined in the embodiment samples 17 to 31 and the comparative samples 7 to 12 was a preferable range for a pulse width ratio Tet/Tmp between the erasing top pulse width Tet and the multipulse width Tmp, at 30%, 50% and 70% in light transmissivity Tr for the highly transparent data layer D0.

Figure 26:
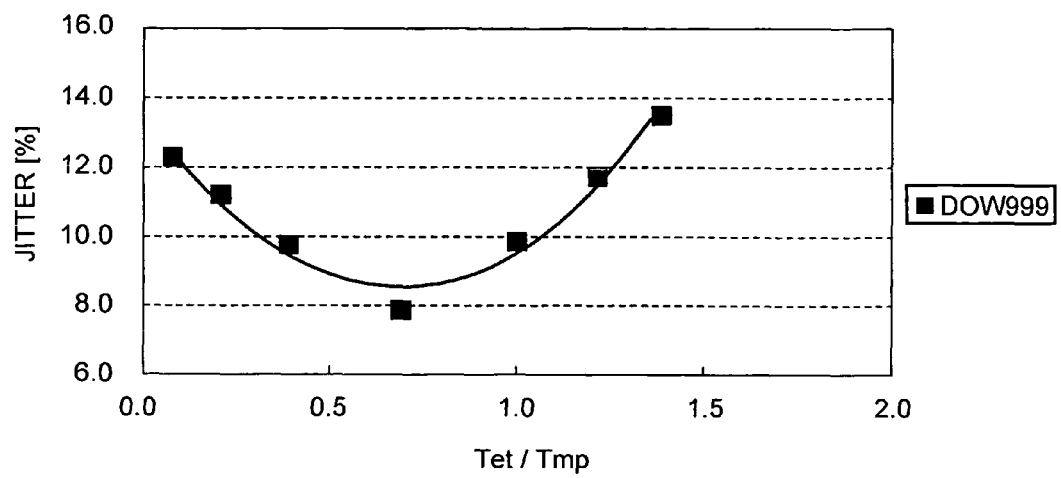
FIG. 26 is a view showing jitter versus pulse width ratio Tet/Tmp at light transmissivity of 30%.
Figure 27:
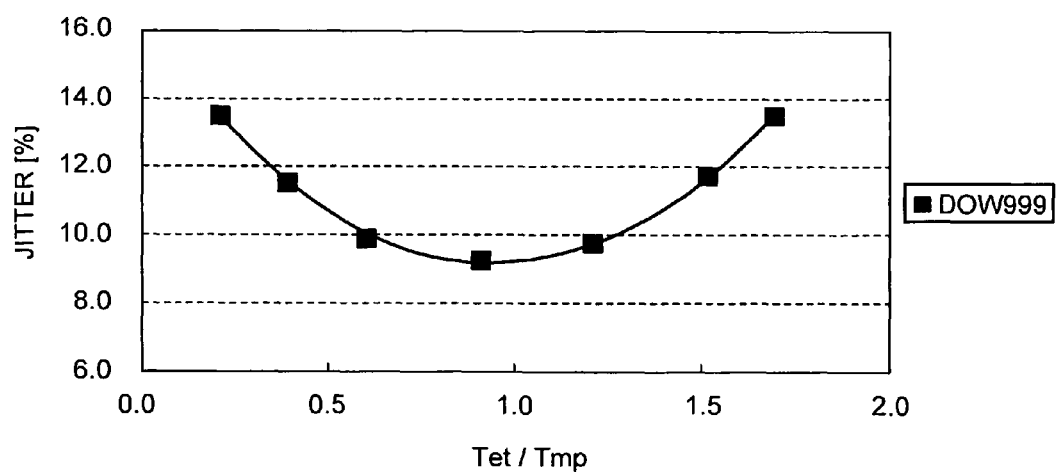
FIG. 27 is a view showing jitter versus pulse width ratio Tet/Tmp at light transmissivity of 70%.

Shown in FIGS. 25 to 27 is DOW999-jitter versus pulse width ratio Tet/Tmp of the recording pulse sequence 2 applied to the highly transparent data layer D0 at 50%, 30% and 70% in light transmissivity Tr, respectively, based on the measurements shown in FIGS. 22 to 24.

A range of the pulse width ratio Tet/Tmp that gives a jitter level lower than 12% that is thought to give less effects to the error rate in DOW999 in each of FIGS. 25 to 27 is as follows: 0.3 to 1.3 at 50% in light transmissivity Tr in FIG. 22; 0.2 to 1.2 at 30% in light transmissivity Tr in FIG. 26; and 0.6 to 1.5 at 70% in light transmissivity Tr in FIG. 27.

In other words:
30% in transmissivity Tr: $0.2 \leq Tet/Tmp \leq 1.2$
50% in transmissivity Tr: $0.3 \leq Tet/Tmp \leq 1.3$, and
70% in transmissivity Tr: $0.4 \leq Tet/Tmp \leq 1.5$ It is thus revealed that $0.4 \leq Tet/Tmp \leq 1.2$ is a preferable range for the pulse width ratio Tet/Tmp at any of the light transmissivities Tr for the highly transparent data layer D0.

A further preferable upper limit for jitter level is 10% under consideration of adverse effects on reproduction compatibility over different types and performances of commercially available recording apparatus.

A range of the pulse width ratio Tet/Tmp that gives such a jitter level of 10% or lower in each of FIGS. 25 to 27 is as follows:
30% in transmissivity Tr: $0.4 \leq Tet/Tmp \leq 1.0$
50% in transmissivity Tr: $0.5 \leq Tet/Tmp \leq 1.0$, and
70% in transmissivity Tr: $0.6 \leq Tet/Tmp \leq 1.2$ It is thus concluded that a further preferable pulse width ratio Tet/Tmp is $0.6 \leq Tet/Tmp \leq 1.0$.

The foregoing discussion leads to findings of the useful erasing pulse width Tet in the present invention, as follows:

The present invention employs the erasing top pulse Tet for steep temperature rise in a recording film. Application of the erasing top power Pet, followed by the erasing power Pe, at a temperature over about 660° C. (a common melting temperature in recording films) does not rapidly cool the recording film. Thus, the recording film is not cooled to below the crystallization temperature and hence does not turn into an amorphous phase. In other words, the recording film starts to turn into the crystalline phase at a moment of beyond the crystallization temperature after temperature rise.

This phenomenon suggests that the erasing top power Pet is required to be higher than the following erasing power Pe in the recording pulse sequence 2. Nevertheless, too much higher erasing top power Pet might damage a recording film.

It is thus revealed that $0.4 \leq Pet/Pw \leq 1.5$ is a preferable range for the power ratio Pet/Pw, as discussed above.

The erasing top pulse Tet is used for steep temperature rise in a recording film to the crystallization temperature in the present invention. There is thus no limitation to a recording pulse sequence to be applied before the erasing top pulse Tet. The inventor of the present invention confirmed that a multipulse sequence with the erasing top pulse Tet, such as shown in FIG. 4, and also a nonmultipulse sequence with the erasing top pulse Tet, such as shown in FIG. 7, are effective in the present invention. It is thus revealed that steep temperature rise in a recording film of the highly transparent data layer D0 does not depend on a pulse sequence to be applied before the erasing top pulse Tet.

Recording multipulse sequences require higher frequency for the top pulse Ttop, the cooling pulse Tcl, etc., for higher speed recording. An application time for such top pulse Ttop, cooling pulse Tcl, etc., is shorter than a response speed of 2 nanoseconds in rising/falling of a general-use laser. In that situation, a 1-pulse application time is adjusted in accordance with laser performance. In other words, useful recording pulse sequences are, for example, a 2T-based multipulse sequence with the erasing top pulse Tet, such as shown in FIG. 5, and a 3T-based multipulse sequence with the erasing top pulse Tet, such as shown in FIG. 6.

The erasing top pulse Tet to be applied just before giving the erasing power Pe in such a multipulse sequence discussed above may not be limited for its pulse with as long as it is used for steep temperature rise in a recording film to the crystallization temperature. Nevertheless, a too much narrower pulse width affects the function of the erasing top pulse Tet whereas a too much wider pulse width affects the temperature of a pulse sequence that follows the pulse Tet. There is thus a preferable range for the pulse width.

In detail, a preferable pulse width ratio Tet/Tmp for a multipulse width Tmp that is a 1-pulse applying time for the multipulse Tmp and an erasing top pulse width Tet that is a 1-pulse applying time for the erasing top pulse Tet is $0.4 \leq Tet/Tmp \leq 1.2$, as discussed above.

Figure 28:
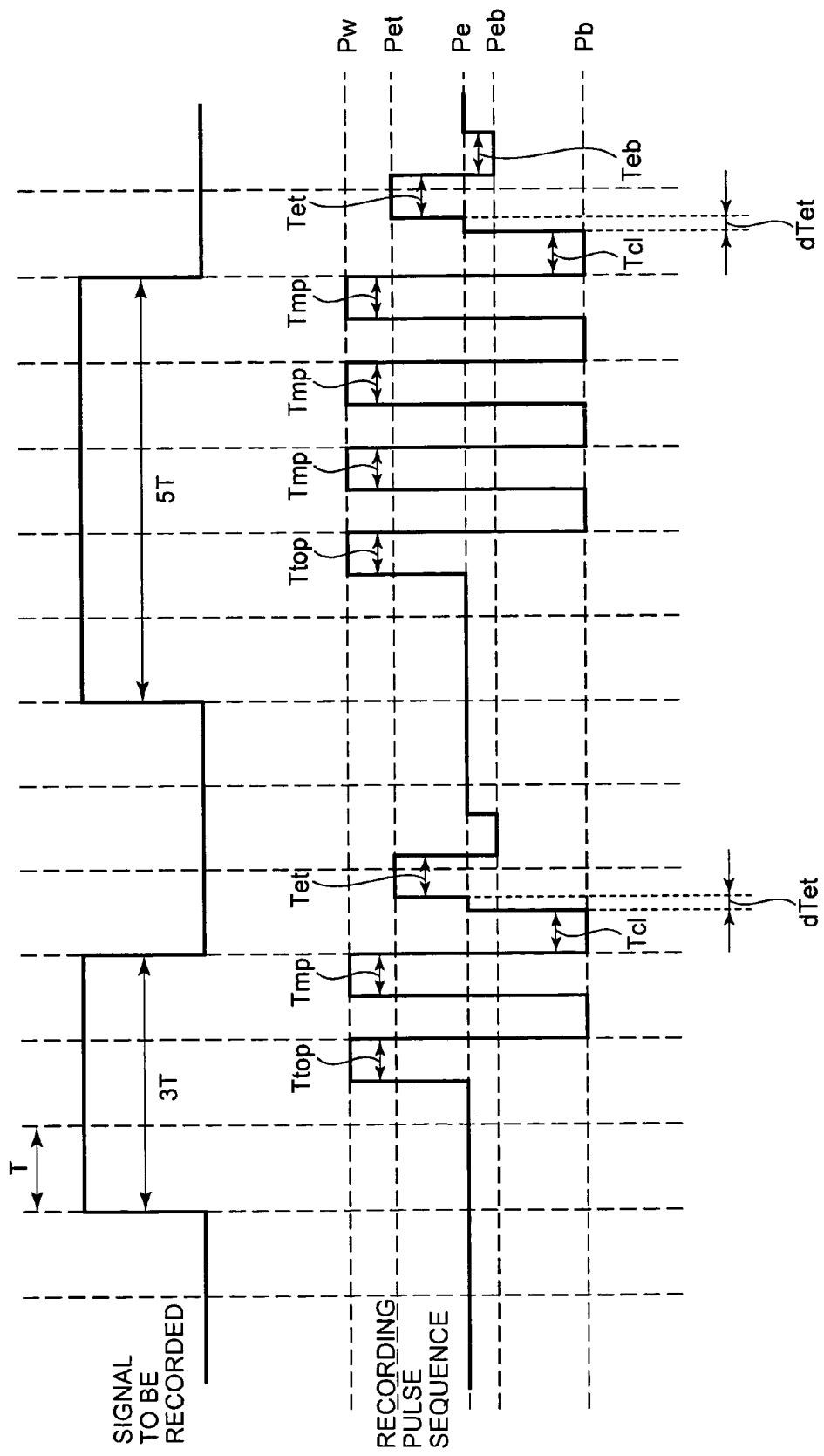
FIG. 28 is a view illustrating an alternative to the recording pulse sequence shown in FIG. 4.

Moreover, the erasing top pulse Tet is used for steep rise in erasing temperature for a recording film, as discussed above, not for raising the erasing temperature itself. One useful recording pulse sequence for that purpose is shown in FIG. 28 in that the erasing top pulse Tet is followed by an erasing pulse Teb for applying an erasing power Peb lower than the erasing power Pe and then applying the erasing power Pe. The power Peb is required be not so lower which could otherwise affect the temperature of a recording film in that it does not reach the crystallization temperature. The application timing for the erasing top power Pet is preferably just after the cooling pulse Tcl, as shown in FIG. 4. Not only that, however, a delay dTet may be provided as shown in FIG. 28 within an effective range.

Figure 29:
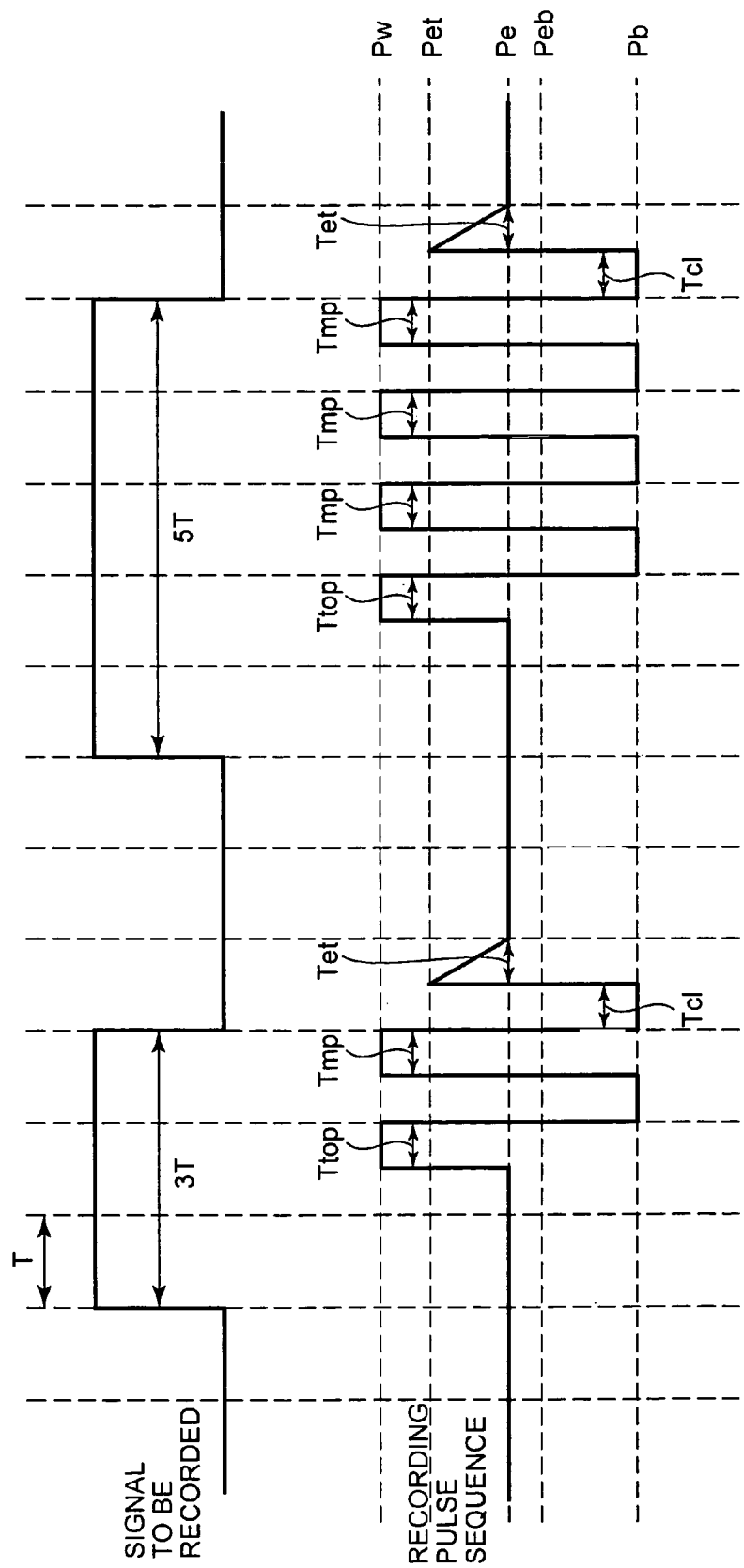
FIG. 29 is a view illustrating another alternative to the recording pulse sequence 2 shown in FIG. 4.

The erasing top pulse Tet may be a triangular waveform, such as, shown in FIG. 29, depending on a pulse generator.

The embodiment employs a rewritable-DVD type multi-layered phase-change optical storage medium. Not only that, however, the present invention is applicable to a high-density storage medium with a short-wavelength laser in recording.

Moreover, the embodiment employs a dual-layer phase-change optical storage medium. Not only that, however, the present invention is applicable to a multi-layered phase-change optical storage medium having three or more of data layers.

As discussed above, in detail, the present invention offers excellent recording and overwrite characteristics to any data layer in a phase change optical storage medium having a plurality of data layers, such as, rewritable multi-layered optical discs and optical cards.

What is claimed is:

1. An optical recording method for a phase-change optical storage medium having a beam-incident surface and a plurality of data layers provided over the surface, each data layer having at least a recording film, comprising the steps of:
a modulation step of modulating data to be recorded to generate modulated data;
a mark-length generation step of generating desired mark-length data based on the modulated data; and
a recording step of emitting a recording beam onto each data layer based on the mark-length data, thus forming a recorded mark carrying the data to be recorded in each data layer, in which,
when forming a recorded mark in a first data layer located most remote from the beam-incident surface among the data layers, generating a first recording pulse sequence having at least a first recording pulse carrying a first erasing power and a first recording power rising from the first erasing power, and a first cooling pulse carrying a first bottom power lower than the first erasing power, and emitting a recording beam onto the first data layer in accordance with the first recording pulse sequence, whereas
when forming a recorded mark in a second data layer different from the first data layer among the data layers, generating a second recording pulse sequence having at least a second recording pulse carrying a second erasing power and a second recording power rising from the second erasing power, a second cooling pulse carrying a second bottom power lower than the second erasing power, and an erasing top pulse carrying an erasing top power higher than the second erasing power, the erasing top pulse also carrying the second erasing power as descending from the erasing top power, in which the second recording pulse, the second cooling pulse and the erasing top pulse are aligned in this order in the second recording pulse sequence so that the erasing top pulse is provided just after the second cooling pulse as the last pulse in the second recording pulse sequence to cause steep temperature rise in the second data layer to a crystallization temperature, and emitting a recording beam onto the second data layer in accordance with the second recording pulse sequence, wherein
the second recording sequence satisfies a relation $0.4 \leq Pet/Pw \leq 1.5$ in which Pet is the erasing top power and Pw is the second recording power, and
the second recording pulse includes a top recording pulse carrying the second erasing power and the second recording power rising from the second erasing power, and at least one multipulse following the top recording pulse, the recording pulse carrying the second bottom power and the second recording power rising from the second bottom power, and the second recording pulse sequence satisfies a relation $0.4 \leq Tet/Tmp \leq 1.2$ in which Tet is a pulse width of the erasing top pulse and Tmp is a pulse width of the recording pulse that follows the top recording pulse.

2. An optical recording apparatus for a phase-change optical storage medium having a beam-incident surface and a plurality of data layers provided over the surface, each data layer having at least a recording film, comprising:
an encoder to modulate data to be recorded to generate modulated data;
a mark-length generator to generate desired mark-length data based on the modulated data;
a controller to determine whether to record the data to be recorded in a first data layer located most remote from the beam-incident surface among the data layers or a second data layer different from the first data layer and generate an instruction signal based on the determination;
a focus and tracking controller to control focusing and tracking to the first or the second data layer, based on the instruction signal; and
a recorder to emit a recording beam onto each data layer based on the mark-length data, thus forming a recorded mark carrying the data to be recorded in each data layer, based on the instruction signal in which,
when forming a recorded mark in the first data layer, the recorder generates a first recording pulse sequence having at least a first recording pulse carrying a first erasing power and a first recording power rising from the first erasing power, and a first cooling pulse carrying a first bottom power lower than the first erasing power, and emitting a recording beam onto the first data layer, whereas
when forming a recorded mark in the second data layer, the recorder generates a second recording pulse sequence having at least a second recording pulse carrying a second erasing power and a second recording power rising from the second erasing power, a second cooling pulse carrying a second bottom power lower than the second erasing power, and an erasing top pulse carrying an erasing top power higher than the second erasing power, the erasing top pulse also carrying the second erasing power as descending from the erasing top power, in which the second recording pulse, the second cooling pulse and the erasing top pulse are aligned in this order in the second recording pulse sequence so that the erasing top pulse is provided just after the second cooling pulse as the last pulse in the second recording pulse sequence to cause steep temperature rise in the second data layer to a crystallization temperature, and emitting a recording beam onto the second data layer in accordance with the second recording pulse sequence,
wherein the second recording sequence satisfies a relation $0.4 \leq Pet/Pw \leq 1.5$ in which Pet is the erasing top power and Pw is the second recording power, and
the second recording pulse includes a top recording pulse carrying the second erasing power and the second recording power rising from the second erasing power, and at least one multipulse following the top recording pulse, the recording pulse carrying the second bottom power and the second recording power rising from the second bottom power, and the second recording pulse sequence satisfies a relation $0.4 \leq Tet/Tmp \leq 1.2$ in which Tet is a pulse width of the erasing top pulse and Tmp is a pulse width of the recording pulse that follows the top recording pulse.

3. The optical recording apparatus according to claim 2, further comprising:
a reproducer to reproduce data already recorded in the optical storage medium;
a detector to detect an error rate on the data thus reproduced; and
a controller to set a level of the erasing top power and a pulse width of the erasing top pulse in the second recording pulse sequence to make the error rate minimum and control the recorder with the set level and pulse width.

* * * * *

UNITED STATES PATENT AND TRADEMARK OFFICE
CERTIFICATE OF CORRECTION

| | | |
|---|---|---|
| PATENT NO. | : 8,072,863 B2 | Page 1 of 1 |
| APPLICATION NO. | : 11/320415 | |
| DATED | : December 6, 2011 | |
| INVENTOR(S) | : Hiroshi Tabata et al. | |

It is certified that error appears in the above-identified patent and that said Letters Patent is hereby corrected as shown below:

On the Title page item (73), should read:

VICTOR ADVANCED MEDIA CO., LTD.

Signed and Sealed this
Tenth Day of July, 2012

David J. Kappos
*Director of the United States Patent and Trademark Office*